United States Patent
Numata et al.

(10) Patent No.: US 7,228,254 B2
(45) Date of Patent: Jun. 5, 2007

(54) SHAPE MODEL GENERATION METHOD AND SHAPE MODEL GENERATION SYSTEM

(75) Inventors: Shouhei Numata, Hitachinaka (JP); Noriyuki Sadaoka, Tokai (JP); Tarou Takagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/206,929

(22) Filed: Aug. 19, 2005

(65) Prior Publication Data
US 2006/0069527 A1 Mar. 30, 2006

(30) Foreign Application Priority Data
Sep. 30, 2004 (JP) ............... 2004-286254

(51) Int. Cl.
*G06F 15/00* (2006.01)
(52) U.S. Cl. ...................... 702/168; 702/167
(58) Field of Classification Search ............... 700/118, 700/119; 702/167, 168
See application file for complete search history.

(56) References Cited

U.S. PATENT DOCUMENTS 6,012,022 A * 1/2000 Michiwaki ................. 702/168
7,024,272 B2 * 4/2006 Thomas et al. ............. 700/182

FOREIGN PATENT DOCUMENTS

| JP | 2002-230056 | 8/2002 |
|---|---|---|
| JP | 3431022 | 5/2003 |
| JP | 2003-240527 | 8/2003 |
| JP | 2003-296699 | 10/2003 |

OTHER PUBLICATIONS

"Concurrent Engineering Using An X-Ray CT and RP", 15th Rapid prototyping Symposium material (1998) (9 pages in Japanese).

* cited by examiner

*Primary Examiner*—Bryan Bui
*Assistant Examiner*—Douglas N Washburn
(74) *Attorney, Agent, or Firm*—Antonelli, Terry, Stout & Kraus, LLP.

(57) ABSTRACT

A shape model generation method or system for generating a shape model from shape description data such as X-ray CT data, including a process by virtual probe measuring unit of causing a virtual probe defined as an area having a finite expansion in a virtual space in the shape description data to sequentially scan a plurality of probe paths sequentially set by probe path setting unit, measuring the shape description data and thereby acquiring a characteristic value specific to the position in the virtual space of the virtual probe for each of the probe paths and a process by the probe path setting unit of generating a new probe path using the characteristic value obtained for the probe paths and thereby sequentially setting the plurality of probe paths.

9 Claims, 23 Drawing Sheets

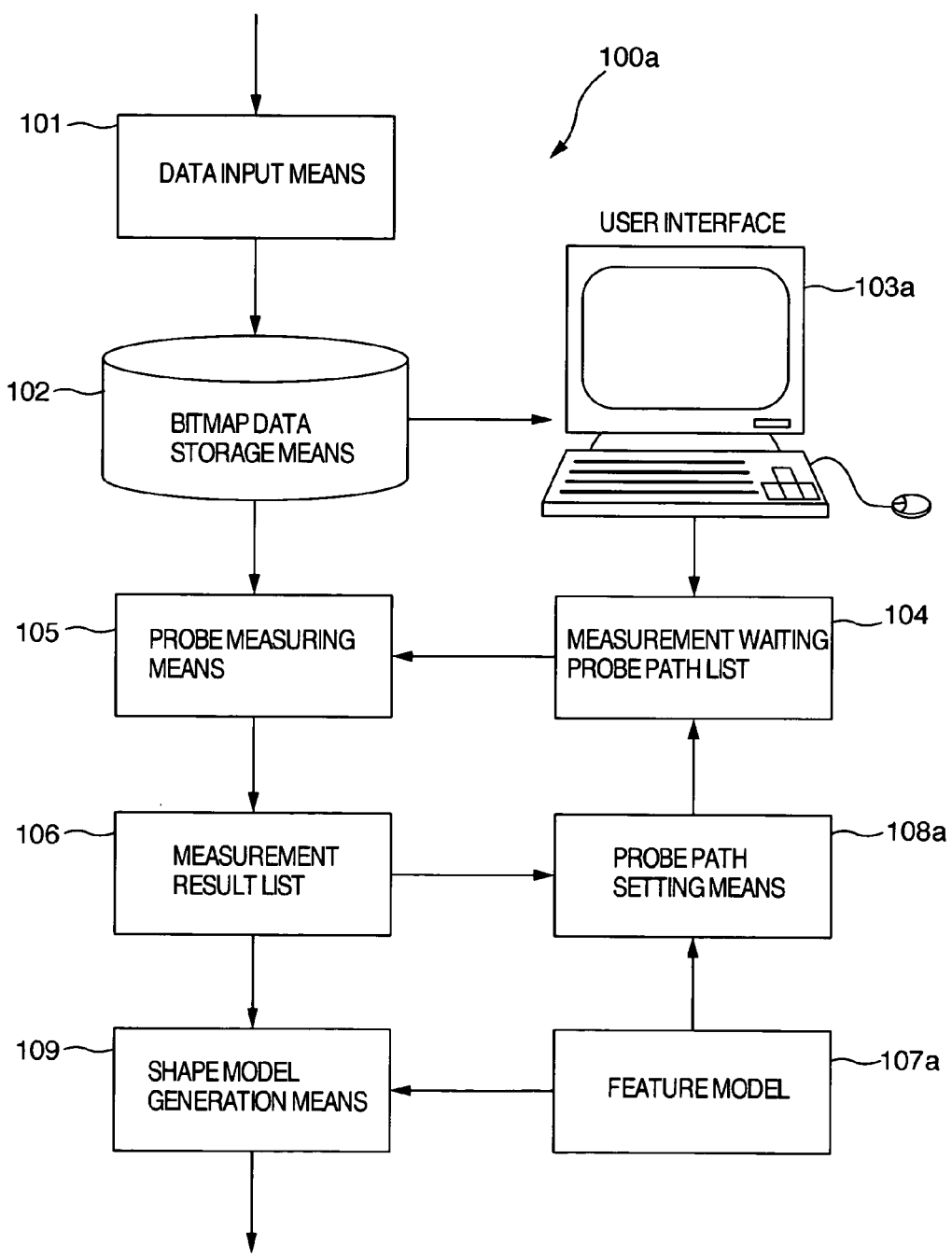

- 3-D BITMAP DATA
- PART INNER CELL EXTRACTION STEP
- EACH INNER CELL NEARBY CELL REFERENCING STEP
- NEARBY CELL CENTER POINT CALCULATION STEP
- POINT CLOUD PUNCTURING STEP
- TEMPORARY MEDIAL POINT CLOUD DATA

3-D BITMAP DATA

PART INNER CELL EXTRACTED DATA

EACH INNER CELL NEARBY CELL

TEMPORARY MEDIAL POINT CLOUD DATA

TEMPORARY MEDIAL POINT BEFORE UPDATE AND TEMPORARY PROBE PATH

UPDATED TEMPORARY MEDIAL POINT AND TEMPORARY PROBE PATH

FIG. 22
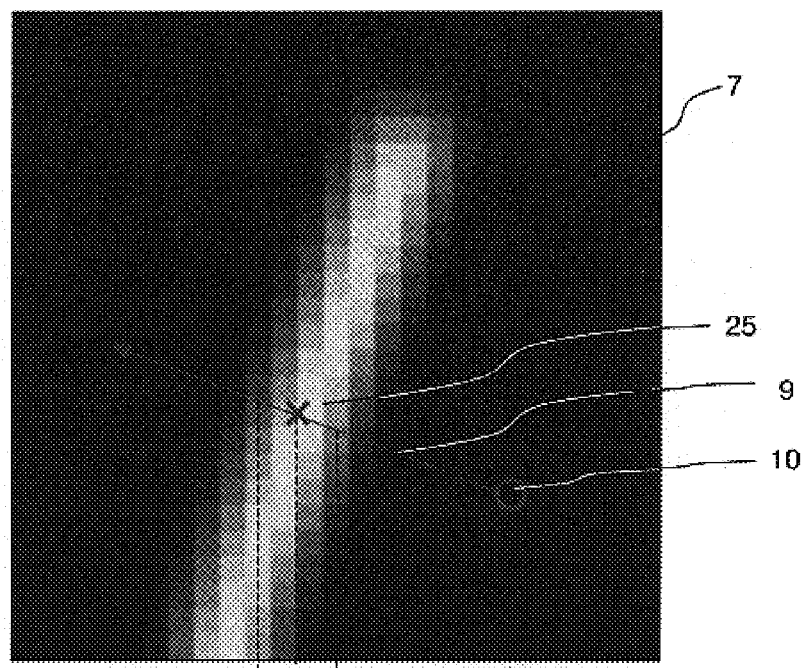
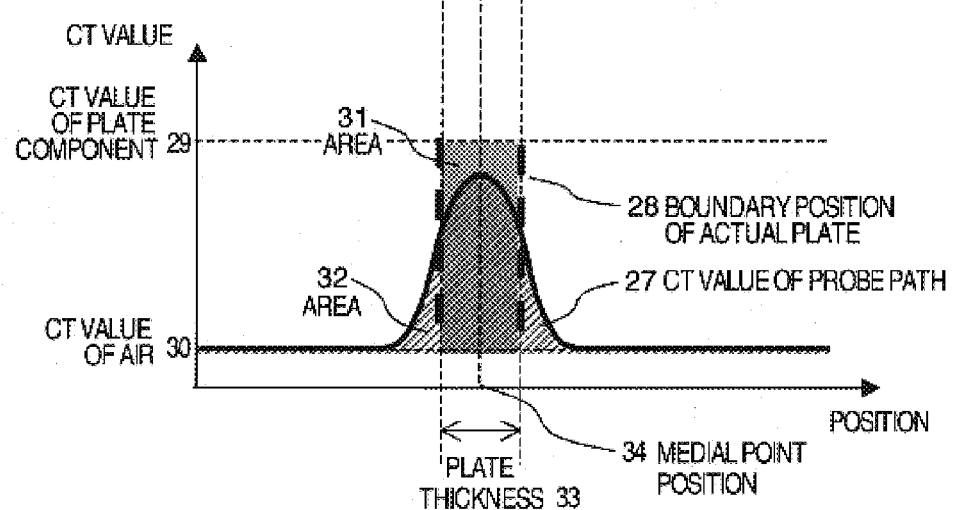

8
MEDIAL POINT

11
PLATE ELEMENT

SHAPE MODEL GENERATION METHOD AND SHAPE MODEL GENERATION SYSTEM

BACKGROUND OF THE INVENTION

The present invention relates to a technique for generating an engineering shape model using a 3-D digitizer, and more particularly, to a shape model generation technique capable of generating a high-precision shape model using a volume scanner such as an X-ray CT as the 3-D digitizer.

In digital engineering using CAD, a technique using the shape of an actual object is collectively called "reverse engineering" in general. The use of the description "reverse" is attributable to the circumstance under which there has been no systematic method for obtaining CAD data from the shape of an actual object so far and the actual object has to be necessarily generated from CAD data. However, prime importance is being placed on reverse engineering for the purpose of making most of the shapes of natural objects such as living body and feeding back the expertise of skilled technicians.

The core of reverse engineering is a "3-D digitizer" which measures a 3-D shape of an object and converts the 3-D shape to 3-D data. As the 3-D digitizer, a probe-type 3-D measuring instrument (CMM: Coordinate Measuring Machine) and optical digitizer have often been used so far. However, X-ray CT capable of converting an inner shape as well as density distribution of an object to data is recently attracting attention. The reverse engineering making full use of an X-ray CT is described more specifically in "Concurrent Engineering using an X-Ray CT and RP" (Katsutoshi Sato, Taro Takagi, Shigeru Idemi, 15th Rapid Prototyping Symposium material (1998)), for example.

A probe-type 3-D measuring instrument and optical digitizer are devices which output "point cloud data." The "point cloud data" is a data format which describes a set of many points (point cloud) which exist on the surface of an actual object. These devices convert only the surface of the object to data, and therefore they are generally called "surface scanners." The point cloud data as is cannot be used in CAD. However, if neighboring points are linked with one another and polygon data is generated, it is possible to divide the 3-D space into the inside and outside of the object and use the polygon data as a "shape model" which contributes to engineering. The work of generating the polygon data from point cloud data is called "mesh generation."

On the other hand, an X-ray CT is a device which outputs "bitmap data." The "bitmap data" is a data format for describing a shape using spatially arranged unit elements called "cells." Since the X-ray CT can convert the inside of an object to data, it is generally called a "volume scanner." The individual cells have a value called a "cell value" which represents an X-ray absorption coefficient of the component material at that point of the object. This value is substantially proportional to the density of the material. Therefore, if a cell having a cell value greater than a predetermined threshold is extracted, it is possible to know a 3-D shape of the solid part of the object. Here, the "cell" is generally used in the case of two-dimensional bitmap data, while in the case of three-dimensional bitmap data, the corresponding element is normally called a "boxel," but in the present specification, "boxel" and "cell" all together may be called "cell."

The bitmap data includes a great amount of information, but there is little compatibility between bitmap data and CAD data. Therefore, the bitmap data as is cannot be used as a shape model. However, if a cell whose cell value matches a threshold is extracted from the bitmap data, it is possible to obtain point cloud data about the surface of the object based on the coordinates. Once the point cloud data is obtained, it is possible to generate a shape model using mesh generation. This method is the one conventionally used to generate a shape model from X-ray CT data.

The threshold of a cell value is generally an average of a cell value corresponding to an internal material (material in the solid part of an object, for example, aluminum) of the object and a cell value corresponding to an external medium (medium which surrounds the solid part of the object from the outside, for example, air). It is a general practice to carry out an interpolation process between cells instead of extracting cells whose cell value matches a threshold, but the underlying idea is the same.

Examples of techniques related to the background of the present invention are not limited to those described above but also include "3-D Dimension Measuring Apparatus and 3-D Dimension Measuring Method" disclosed in Japanese Patent No. 3431022.

The above described conventional techniques using X-ray CT data have several problems. One of them is that when the thickness of the solid part of an object is smaller than a predetermined value, it is not possible to obtain point cloud data or generate a shape model. X-ray CT data generally includes certain defocusing. An extension of defocusing (defocusing expansion) is normally 2 to 5 cells (the cell size is generally on the order of 100 to 500µ). Because of this defocusing, if the thickness is equivalent to the defocusing expansion or smaller than the defocusing expansion, the cell value even in a medial part (medial line part) of the thin part does not reach the original value of the material of the part. When the thickness is extremely small, the cell value even does not reach the threshold, and therefore the fact per se that the object exists in that part may be overlooked.

Another problem is that when an object made of a plurality of different materials is handled, it is not possible to model the plurality of different materials simultaneously and accurately. This is attributable to the fact that there are a plurality of internal materials and it is therefore not possible to determine a threshold of an appropriate cell value.

A further problem is that it is not possible to make full use of shape features (features) of the object. With the conventional technique which converts bitmap data to point cloud data, many features are lost making it no longer possible to use a technique which statistically eliminates measurement errors making full use of the features.

Against the above described background, the present invention relates to generation of a shape model from shape description data such as X-ray CT data and it is a first object of the present invention to provide a more user-friendly shape model generation method capable of eliminating the above described various problems, it is a second object to provide a computer program implementing the method and it is a third object to provide a shape model system for executing the above described method.

SUMMARY OF THE INVENTION

In order to attain the above described first object, the present invention is a shape model generation method for generating a shape model of an object from data acquired for the object to describe the shape of the object, including a process by virtual probe measuring means of causing a virtual probe defined as an area having a finite expansion in a virtual space in the shape description data to sequentially scan a plurality of probe paths sequentially set by probe path setting means, measuring the shape description data and thereby acquiring a characteristic value specific to the position in the virtual space of the virtual probe for each of the probe paths and a process by the probe path setting means of generating a new probe path using the characteristic value obtained for the probe paths and thereby sequentially setting the plurality of probe paths.

Furthermore, the above described shape model generation method of the present invention also uses a feature model which describes shape features inherent in the object from physical properties and functional inevitability, etc., of the object to generate the next probe path.

Furthermore, according to the present invention, when a shell model is generated for an object including a plate element, the virtual probe measuring means acquires the position of a medial point of the plate element in the thickness direction as the characteristic value from the shape description data to generate the new probe path using this acquired medial point.

The above described shape model generation method of the present invention further includes a process of extracting a medial point at an edge of the plate element; a process of setting a probe path which is parallel to the plane of the plate element at the edge medial point and perpendicular to the end face of the edge and passes through the edge medial point; and a process of carrying out measurement using the virtual probe measuring means along the probe path which passes through the edge medial point and obtaining a true edge medial point.

The above described shape model generation method of the present invention further includes, when the plate element includes a joint part, a process of extracting a medial point at which the thickness of the plate element and a normal vector of the plate element which are the characteristic values obtained through the measurement by the virtual probe measuring means with respect to the medial point differ from the thickness of the plate element and the normal vector of the plate element in the vicinity of the medial point by a predetermined value or greater and thereby detecting the joint part.

Furthermore, according to the above described shape model generation method of the present invention, when a shape model of a fluid machinery component is generated, the virtual probe measuring means acquires the position of a medial point on a cross section of a channel of the fluid machinery component as the characteristic value from the shape description data and generates the new probe path using this acquired medial point.

Furthermore, according to the above described shape model generation method of the present invention, when a shape model of a pipeline having a pipeline component is generated, the virtual probe measuring means acquires the position of a cross section center point in the pipeline component as the characteristic value from the shape description data and generates the new probe path using this acquired center point.

Furthermore, according to the above described shape model generation method of the present invention, when a shape model of a hybrid material made up of a plurality of different materials is generated, the virtual probe measuring means acquires the surface position for each of the different materials as the characteristic value from the shape description data and generates the new probe path using this acquired surface position.

In order to attain the above described first object, the present invention is a shape model generation method for generating a shape model of an object from data acquired for the object to describe the shape of the object, including a process by virtual probe measuring means of causing a virtual probe defined as an area having a finite expansion in a virtual space in the shape description data to sequentially scan a plurality of probe paths, measuring the shape description data and thereby acquiring a characteristic value specific to the position in the virtual space of the virtual probe for each of the probe paths; a process by temporary internal point cloud generation means of generating temporary internal point cloud data about inner points such as a temporary medial point positioned inside the object from the shape description data; a process by temporary probe path setting means of temporarily setting a probe path for the respective inner points of the temporary internal point cloud using the respective inner points as passing points; a process by temporary internal point cloud/temporary probe path updating means of updating the temporary internal point cloud based on the characteristic value acquired by the virtual probe measuring means through measurement of the temporary probe path and updating/setting the probe path for each point of the new temporary internal point cloud obtained by this update and a process by convergence detection means of carrying out convergence detection on the temporary probe path updated/set by the temporary internal point cloud/temporary probe path updating means and regarding, when it is decided that a predetermined convergence condition is satisfied, the temporary internal point cloud as a true inner point cloud.

In order to attain the above described second object, the present invention forms a computer program implementing the above described shape model generation method.

In order to attain the above described third object, the present invention is a shape model generation system for generating a shape model of an object from data acquired for the object to describe the shape of the object, including data input means for inputting the shape description data, data storage means for storing data input by the data input means; a user interface operated by a user; virtual probe measuring means for causing a virtual probe defined as an area having a finite expansion in a virtual space of the shape description data on a computer program to sequentially scan a plurality of sequentially set probe paths, measuring the shape description data and thereby acquiring a characteristic value specific to the position in the virtual space of the virtual probe for each of the probe paths; a measurement waiting probe path list which stores the probe path yet to be measured; and probe path setting means for generating a new probe path using the characteristic value about the probe path and thereby sequentially setting the probe paths.

Furthermore, the above described shape model generation system of the present invention further includes a feature model which describes shape features inherent in the object from physical properties and functional inevitability of the object.

In order to attain the above described third object, the present invention is a shape model generation system for generating a shape model of an object from data acquired for the object to describe the shape of the object, including virtual probe measuring means for causing a virtual probe defined as an area having a finite expansion in a virtual space of the shape description data to sequentially scan a plurality of probe paths, measuring the shape description data and thereby acquiring a characteristic value specific to the position in the virtual space of the virtual probe for each of the probe paths; temporary medial point cloud generation means for generating temporary media point cloud data about a temporary medial point positioned inside the object from the shape description data; temporary probe path setting means for temporarily setting probe paths for each medial point of the temporary medial point cloud using the medial points as passing points; temporary medial point cloud/temporary probe path updating means for updating the temporary medial point cloud based on the characteristic value acquired by the virtual probe measuring means through measurement of the temporary probe path and updating the probe paths for the respective medial points of a new temporary medial point cloud acquired by this update; and convergence detection means of carrying out convergence detection on the temporary probe path updated/set by the temporary medial point cloud/temporary probe path updating means under a predetermined convergence condition.

The present invention obtains data for shape modeling from shape description data such as X-ray CT data using virtual probe measurement. For this reason, the shape model generation method or shape model generation system of the present invention can effectively solve above described various problems of the conventional method whereby X-ray CT data is converted into point cloud data and data is obtained for shape modeling and provides a more user-friendly method. Furthermore, the present invention allows many probe paths required for virtual probe measurement to be automatically set by the probe path setting means. This can drastically reduce the user's burden and provide a more user-friendly method or system.

Other objects, features and advantages of the invention will become apparent from the following description of the embodiments of the invention taken in conjunction with the accompanying drawings.

BRIEF DESCRIPTION OF THE DRAWINGS

FIG. 4 illustrates the structure of a shell model generation system;

FIG. 22 illustrates a conceptual rendering of a process of measuring a medial point and plate thickness of a plate component using a virtual probe;

DETAILED DESCRIPTION OF THE INVENTION

Preferred embodiments in implementing the present invention will be explained below. Basic explanations of one of general embodiments when the present invention is implemented will be described first and then embodiments of specific applications will be explained individually. For simplicity of explanation, the present Specification describes many of figures and explanations assuming that they are two-dimensional, but the basic idea is the same when they are described three-dimensionally.

Figure 1:
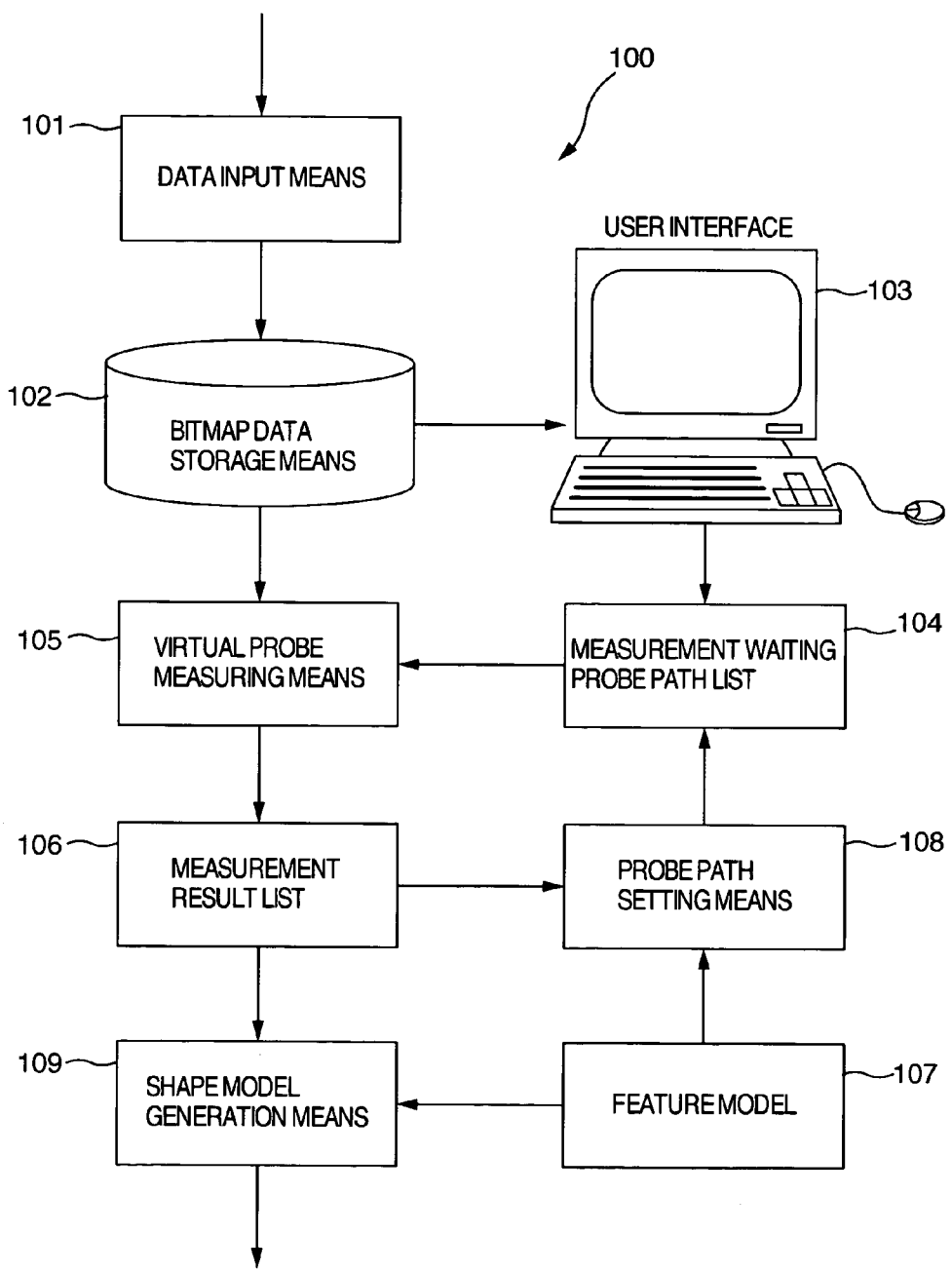
FIG. 1 illustrates the structure of a shape model generation system according to a general embodiment of the present invention.

General Embodiment;

FIG. 1 shows the basic structure of a shape model generation system according to a general embodiment of the present invention. This shape model generation system 100 is constructed by including data input means 101, bitmap data storage means (shape description data storage means) 102, a user interface 103, a measurement waiting probe path list 104, virtual probe measuring means 105, a measurement result list 106, a feature model 107, probe path setting means 108 and shape model generation means 109.

The data input means 101 captures X-ray CT data obtained by picking up the image of an object using an X-ray CT device as shape description data of the object into the system and stores the image in the bitmap data storage means 102 and is implemented by a media drive compatible with the format of the X-ray CT data or a data conversion program, etc.

The bitmap data storage means 102 stores X-ray CT data and allows cell values to be freely referenced and is implemented by a magnetic disk or semiconductor memory, etc.

The user interface 103 is used for the user to set a first probe path (probe path; path through which a virtual probe which will be described later scans and performs measurement) used in virtual probe measurement by the virtual probe measuring means 105 in the system interactively. In addition, to allow the user to set measurement conditions such as the diameter of the virtual probe, threshold of a cell value, measuring algorithm (position measurement, width measurement, measurement of materials of different types), the corresponding function may be given to the user interface 103. For simplicity of description, the present Specification may also simply describe the probe path for which a measurement condition is specified as a "probe path." In addition to hardware such as a display, mouse, keyboard, the user interface 103 is constructed of software such as a rendering program for a display and a front-end processor for interpreting an input. An operation of the user interface 103 can be summarized as follows:

1. Presents X-ray CT data (actually an image with X-ray CT data) to the user using a display and rendering program.

2. The user inputs information necessary to set the first probe path while watching the X-ray CT data displayed on the display using a mouse/keyboard.

3. The front-end processor which has received the input from the mouse/keyboard interprets it and generates a first probe path.

4. The first probe path generated in this way is sent to the measurement waiting probe path list 104 and stored therein.

The detailed operation of the user interface 103 actually varies from one application system to another. This will be explained more specifically in embodiments related to applications which will be described later.

The measurement waiting probe path list 104 is a list for storing unmeasured probe paths.

The virtual probe measuring means 105 performs measurement for shape modeling on the X-ray CT data of an object using a virtual probe. More specifically, the virtual probe measuring means 105 extracts an unmeasured probe path from among the probe paths stored in the measurement waiting probe path list 104, conducts measurement using the virtual probe about the probe path and acquires characteristic values specific to a position in a virtual space of the X-ray CT data of the virtual probe (medial point, thickness of element and channel width, etc., in application examples which will be described later) for each probe path. The measurement result is sent to the measurement result list 106 and stored therein. The virtual probe is a virtual "measurement tool" defined as an area (inspection area) having a finite expansion (area or volume) in a virtual space in the X-ray CT data on a computer program. Such a virtual probe is explained more specifically in Japanese Patent No. 3431022.

The measurement result list 106 is a list for storing the result of measurement conducted by the virtual probe measuring means 105.

The feature model 107 is a model which describes shape features inherent in the object. This is assumed based on the physical properties and functional inevitability of the object subjected to shape modeling. The specific contents will be explained in more detail in embodiments which will be described later.

The probe path setting means 108 generates and sets a new probe path based on the contents of the measurement result list 106 and the feature model 107.

The shape model generation means 109 generates a shape model based on the contents of the measurement result list 106 and the feature model 107 and outputs the shape model in a format that can be used in a CAD system.

The above described feature model 107, probe path setting means 108 and shape model generation means 109 are implemented as parts of a computer program.

This is the general structure of the shape model generation system 100. Next, a general processing operation of the shape model generation system 100 will be explained. The basic concept of the shape model generation system 100 is to introduce "setups" to virtual probe measurement (measurement by the virtual probe measuring means) based on the feature model 107 of the object to be measured. The "setups" refer to a series of steps necessary to realize a target. The target here is to obtain parameters (shape modeling data) necessary to create a high-precision shape model by measuring X-ray CT data.

In order to realize setups of measurement, the shape model generation system 100 adopts a technique of successively adding new probe paths based on the measurement result about the first probe path and feature model 107 of the object to be measured based on the first probe path given by the user interface 103.

This will be more easily understandable when virtual probe measurement is seen in analogy to "scaffolding" in a building. The scaffolding is assembled on ground first and then piled up gradually. A higher part cannot be assembled before the ground part is assembled. The same is true with the virtual probe measurement and probe paths may not be determined without conducting preliminary measurements.

Introducing setups to measurement allows measurement with minimum wastage and makes it possible to generate a shape model in a short time and assembling setups which make full use of features of the shape of the object allows a shape model of high quality to be generated. This concept is generally applicable, and therefore there can be various applications. Embodiments in typical applications will be explained below.

Figure 2A:
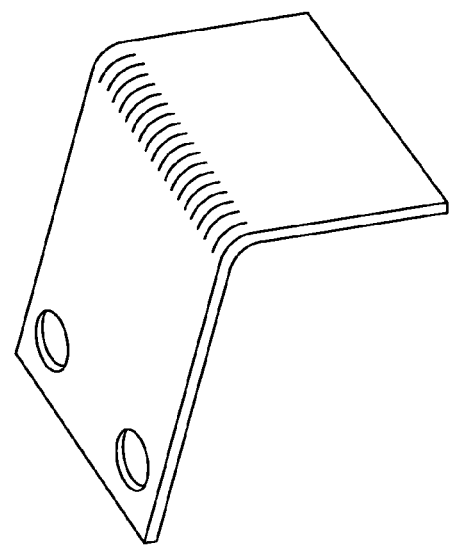
FIGS. 2A, 2B illustrate an appearance of a sheet metal component and an example of X-ray CT data thereof.
Figure 2B:
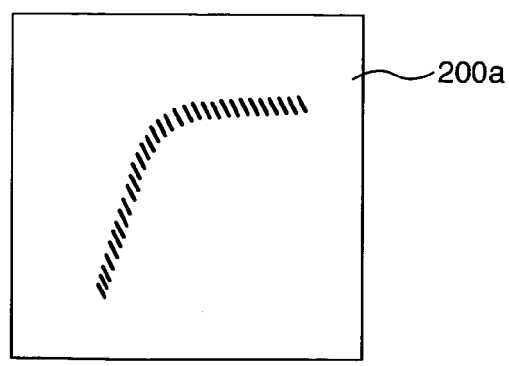
Figure 3A:
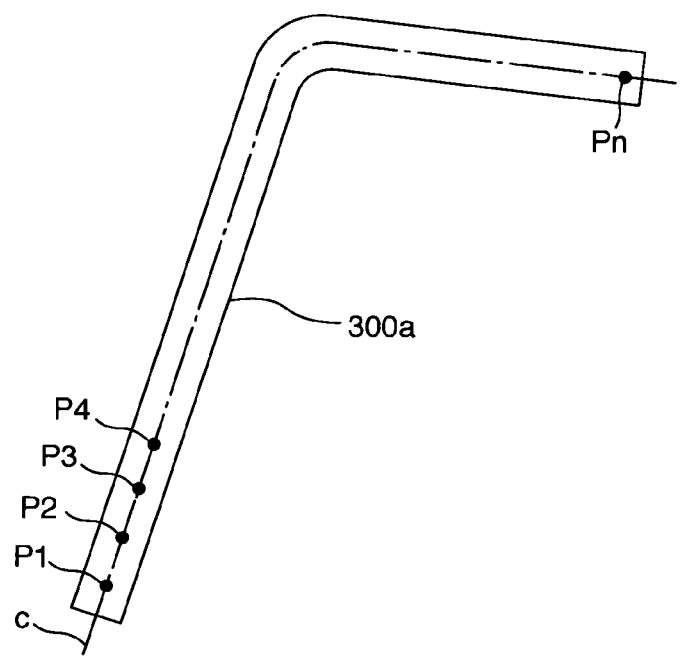
FIGS. 3A, 3B illustrate an example of a shell model.
Figure 3B:
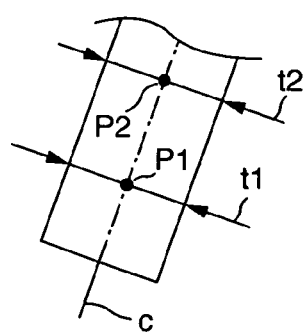

First Embodiment of Application;

A first embodiment is an example related to a shell model generation system for generating a shell model about a sheet metal component which is an object including a plate element. An object of the shell model generation system is to generate, for example, a shell model 300a as shown in FIGS. 3A, 3B from X-ray CT data 200a (FIG. 2B) of a sheet metal component (FIG. 2A) shown in FIGS. 2A, 2B. The object shown in FIG. 3B is a partially enlarged view of the shell model 300a in FIG. 3A. Since the thickness of the sheet metal is equal to or smaller than that of a defocusing expansion of the X-ray CT data 200a, it is not possible to apply a conventional technique of setting a threshold for a cell value and extracting the shape. Therefore, the use of the present invention is effective.

When a thin object such as a sheet metal is handled in CAD, it is a general practice to realize modeling using medial point clouds P1 to Pn making up a medial plane C in the thickness direction of the plate element in the sheet metal component and thicknesses t1 to tn at the respective medial points, and therefore the shell model 300a also complies with this.

FIG. 4 shows the structure of a shell model generation system in this embodiment. The basic structure of this shell model generation system 100a is the same as that of the shape model generation system 100. The following explanations will focus on the mounting specific to the shell model generation system 100a.

Figure 5:
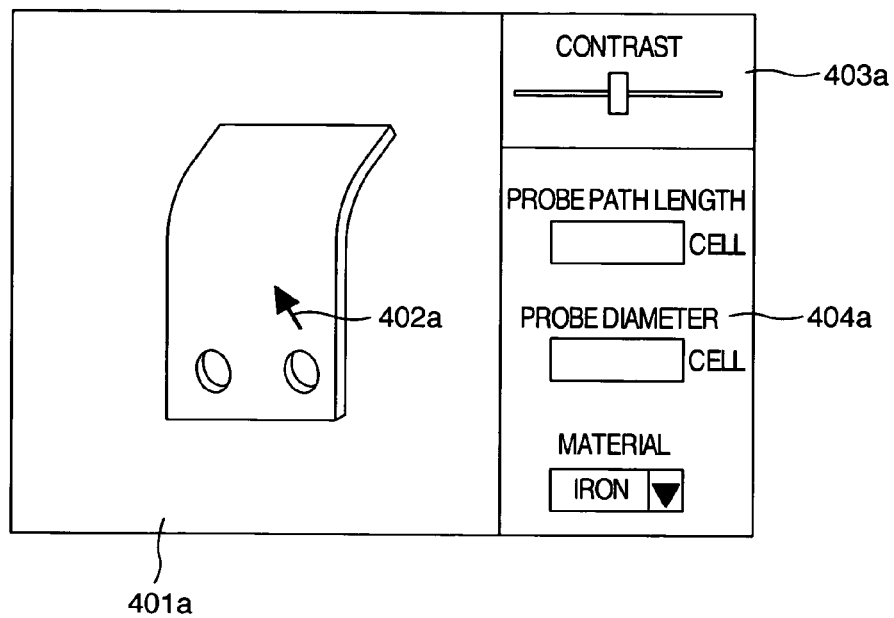
FIG. 5 illustrates an example of a screen displayed by a user interface of the shell model generation system.

FIG. 5 shows an example of a screen displayed on a display in the user interface 103a of the shell model generation system 100a. The display shows a rendering image 401a resulting from a volume-rendering of the X-ray CT data 200a. The contrast of the rendering image 401a can be adjusted by the user using a contrast adjustment panel 403a for better visibility.

The user specifies one point on the screen using a mouse cursor 402a while watching the rendering image 401a. Then, one visual line is determined from two-dimensional coordinates on the screen of this specified point and rendering direction of the X-ray CT data 200a (perspective view direction in the rendering image). The front-end processor searches for the surface of the object along this visual line and finds out surface points of the object. By conducting similar searches for several points in the vicinity of the specified point, it is possible to obtain a normal vector of the surface in the vicinity of the surface points of the object. In this way, the specified point determines the position of the probe path and the surface normal vector determines the direction of the probe path. Then, when the probe scanning length is set on the measurement condition setting panel 404a, it is possible to generate a rectilinear probe path. This is the process in which the user sets the first probe path in the system interactively.

The feature model 107a of the shell model generation system 100a assumes, for example, the following features for the sheet metal component which is the object:

1. The thickness t does not change drastically and the first-order derivative is continuous on both the front and back planes.

2. The curvature radius of the medial plane C is 3 mm or more.

These features are determined in consideration of the manufacturing process of the sheet metal component.

Figure 6:
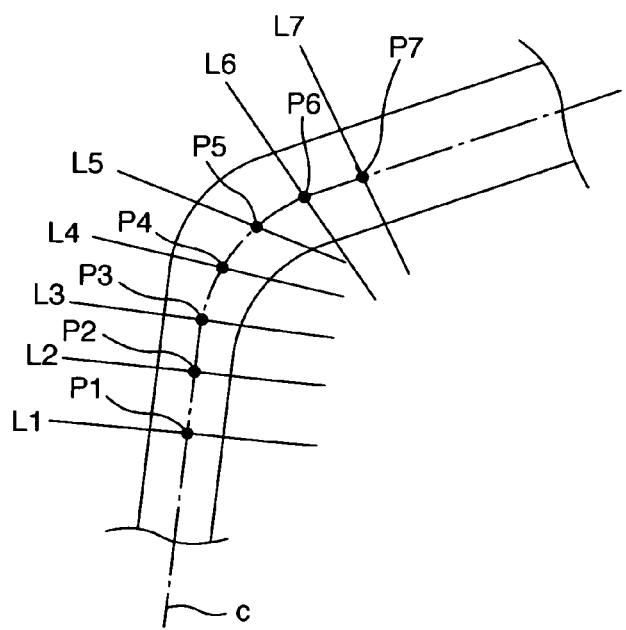
FIG. 6 illustrates a process by the probe path setting means of the shell model generation system.

The probe path setting means 108a of the shell model generation system 100a successively generates and sets the probe path based on the first probe path and feature model 107a set as described above. The process will be shown in FIG. 6.

1. The first probe path L1 is measured and a medial point P1 is obtained. Several measuring algorithms are available for virtual probe measurement and the use of a technique called "width measurement" makes it possible to accurately measure the thickness of the thin part and obtain the medial point. The "width measurement" is explained in detail in Japanese Patent No. 3431022 as a technique of defocusing an image of X-ray CT data.

2. By slightly translating the probe path L1, a probe path L2 is obtained and stored in the measurement waiting probe path list 104. The amount of translation is determined based on the feature model 107a. More specifically, considering the feature that the curvature radius of the medial plane C is 3 mm or more, the amount of translation is set to 1 mm which is less than ½ thereof.

3. The virtual probe measuring means 105 measures the probe path L2, obtains a medial point P2 and stores it in the measurement result list 106.

4. From the medial point P1 and medial point P2, a normal vector of the medial plane C in the vicinity thereof is obtained.

5. The medial point of the probe path L2 is moved to the opposite side of the probe path L1 and the normal vector of the medial plane C obtained in the process 4 is applied thereto. A new probe path L3 is obtained in this way and stored in the measurement waiting probe path list 104.

6. The virtual probe measuring means 105 measures the probe path L3, finds a medial point P3 and stores it in the measurement result list 106.

7. From a set of medial points in the vicinity of the medial point P3, a normal vector of the medial plane C is obtained.

8. The above described processes 5 to 7 are repeated until no new medial point is obtained any longer.

Through the above described processes by the probe path setting means 108a and virtual probe measuring means 106, the measurement result list 106 stores coordinates of many medial points, normal vectors of medial plane C in the vicinity of the medial points and thicknesses t1 to tn of the material at the respective medial points.

When the above described process is completed, the shape model generation means 109 of the shell model generation system 100a rearranges the medial points stored in the measurement result list 106, links them with one another and outputs as curved plane data. If the curved plane data is output in a highly compatible format such as IGES (Initial Graphic Exchange Specification), it can be used for a finite element analysis as a shell model, etc.

Figure 7A:
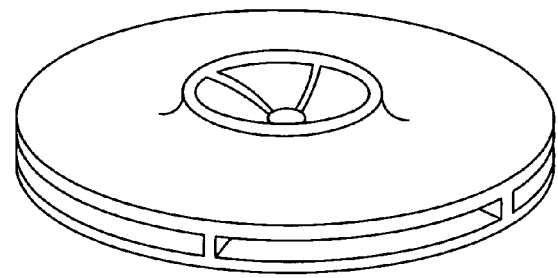
FIGS. 7A, 7B illustrate an appearance of an impeller and an example of X-ray CT data thereof.
Figure 7B:
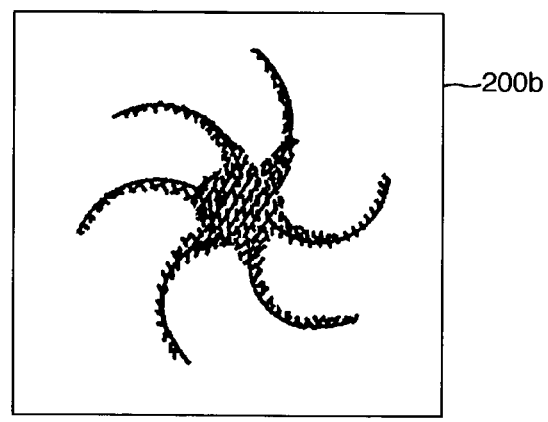
Figure 8:
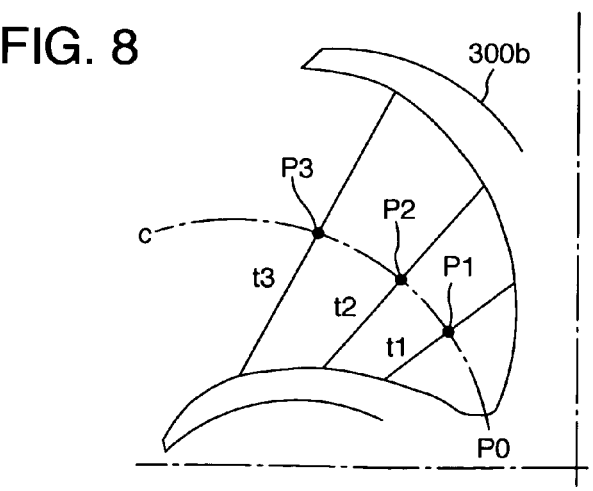
FIG. 8 illustrates an example of a blade shape model.

Second Embodiment of Application;

The second embodiment is an example related to a fluid machinery component shape model generation system used to generate a shape model of a fluid machinery component such as a blade of a centrifugal pump, for example. An object of the fluid machinery component shape model generation system is to generate a blade shape model 300b as shown in FIG. 8 from the X-ray CT data 200b (FIG. 3B) of an impeller model (FIG. 3A) of a centrifugal pump whose appearance is shown in FIGS. 7A, 7B. The impeller model is rotationally symmetric and is expected to be converted to a high-precision model by averaging measurement results of a plurality of blades. The present invention which successively performs measurements is effectively applicable to this case, too.

In the design of a fluid machinery such as a centrifugal pump, it is a general practice to define a medial plane C of a channel using blades and model the medial plane C using medial point clouds P1 to Pn thereon and channel widths t1 to tn at the respective medial points, and therefore the blade shape model 300b also complies with this.

Figure 9:
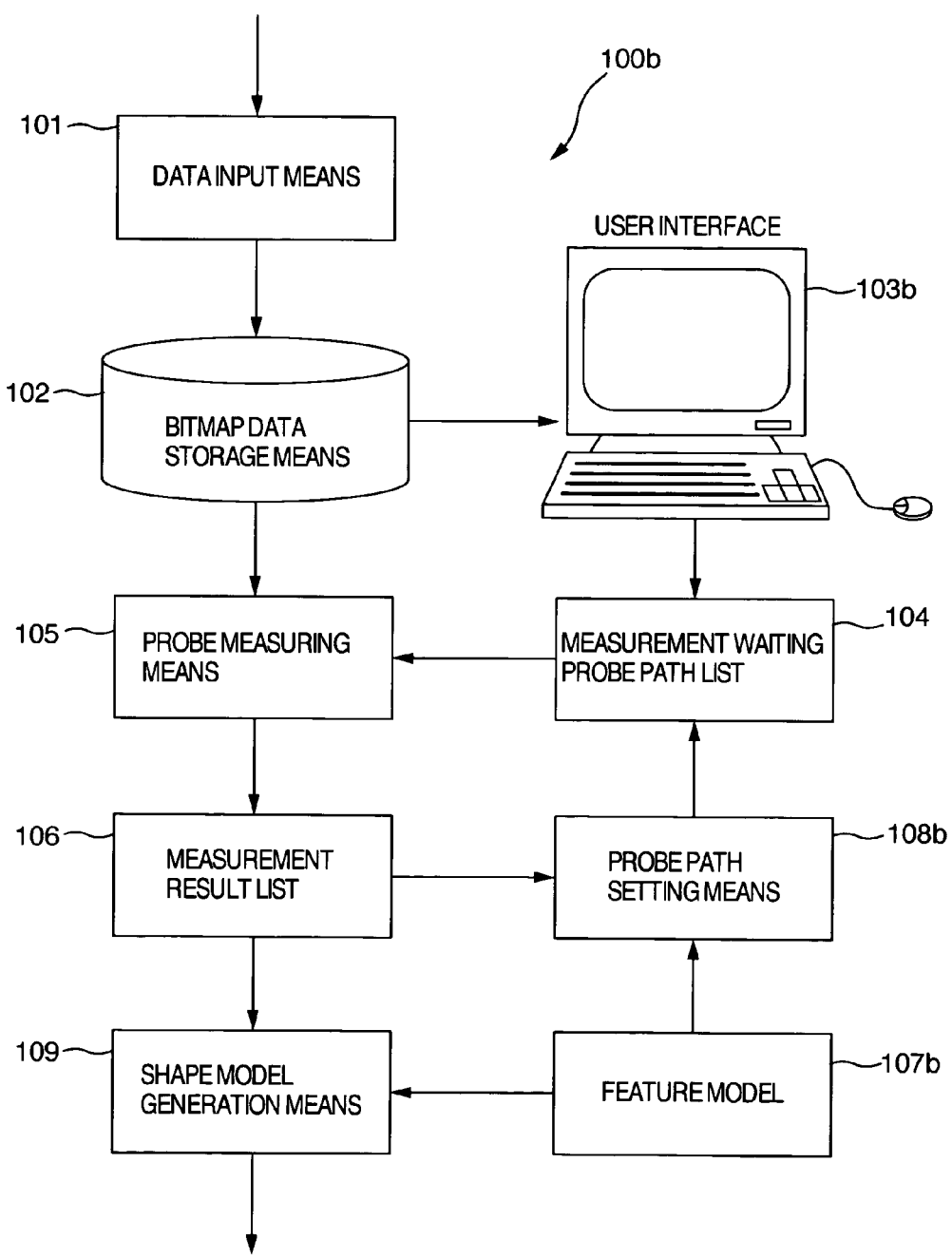
FIG. 9 illustrates the structure of a fluid machinery component shape model generation system.

The structure of the fluid machinery component shape model generation system according to this embodiment is shown in FIG. 9. The basic structure of this fluid machinery component shape model generation system 100b is the same as that of the shape model generation system 100. The following explanations will focus on the mounting specific to the fluid machinery component shape model generation system 100b.

Figure 10:
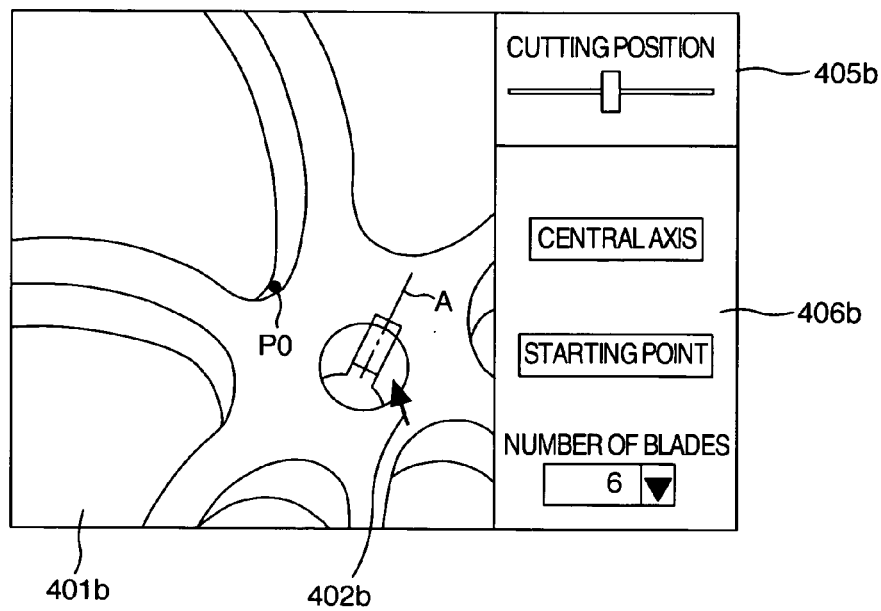
FIG. 10 illustrates an example of a screen displayed by a user interface of the fluid machinery component shape model generation system.

FIG. 10 shows an example of a screen displayed by the user interface 103b of the fluid machinery component shape model generation system 100b on a display. The display shows a rendering image 401b which cuts and renders the X-ray CT data 200b. The cutting position of the rendering image 401b can be adjusted using the cutting position adjustment panel 405b. The user specifies one point of the inner wall of a hub hall into which a central axis fits using a mouse cursor 402b while watching the rendering image 401b. Then, one visual line is determined from two-dimensional coordinates of this specified point on the screen and the rendering direction of the X-ray CT data 200b. When a "central axis" button on the operation panel 406b is pressed, the front-end processor searches for the surface of the object along this visual line and finds out surface points of the object. When one surface point is found, it is possible to know a central axis A of the impeller model using a technique called a "growing surface method." The growing surface method is described in detail in JP-A-2002-230056.

Then, the user specifies a starting point P0 of the channel using the mouse cursor 402b. The starting point P0 of the actual channel is at an inlet of the channel of the impeller and is not located on the surface of the blade as shown in FIG. 10, but for simplicity of explanation, the figure describes as if it exists on the surface of the blade. Pressing the "starting point" button on the operation panel 406b after specifying the starting point P0 of the channel generates the following two types of probe path as first probe paths.

1. L0r: A rectilinear path which passes through the starting point P0 and the central axis A of the channel and is perpendicular to the central axis A.

2. L0t: An arc-shaped path which passes through the starting point P0 of the channel and is centered on the central axis A within the plane perpendicular to the central axis A.

The feature model 107b of the fluid machinery component shape model generation system 100b assumes, for example, the following features about the impeller model which is the object:

1. The channel cross section does not change drastically and the curvature radius along the flow is 10 mm or more.

2. Generally quadrangle and the first-order derivative is continuous on the respective planes.

3. Rotationally symmetric in the number of blades. When the number of blades is, for example, 6, rotating the impeller 60 degrees around the central axis A causes it to substantially overlap with the original shape.

These features are inevitably determined taking into account the condition to be satisfied in order for the centrifugal pump impeller to function.

Figure 11:
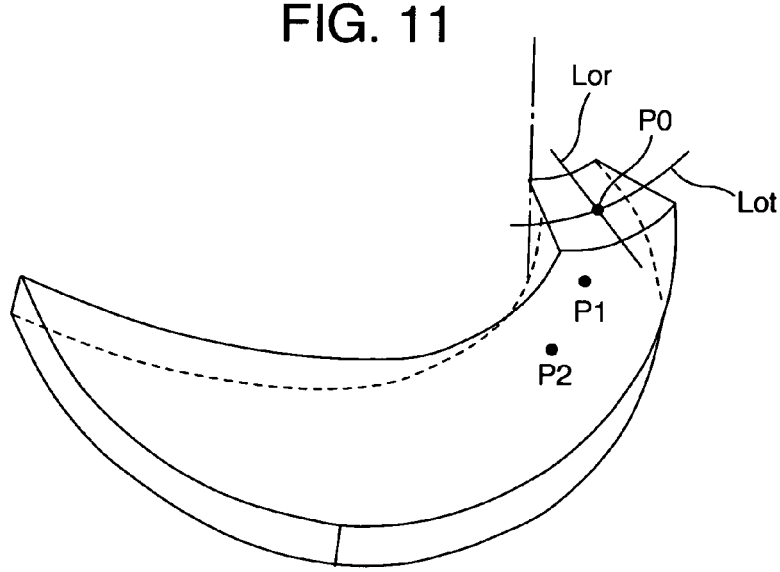
FIG. 11 illustrates a process by the probe path setting means in the fluid machinery component shape model generation system.

The probe path setting means 108b of the fluid machinery component shape model generation system 100b successively generates and sets probe paths based on the first probe paths and feature model 107b set as described above. The process is shown in FIG. 11.

1. The virtual probe measuring means 105 measures the first probe paths L0r, L0t obtained from the medial point P0, obtains a correct medial point P0' (not shown) and stores it in the measurement result list 106. Since the distance and angle of the medial point P0' with respect to the central axis A are known through measurement of the respective probe paths, the three-dimensional position of the medial point P0' is determined based thereon. When the number of blades is specified by the operation panel 406b, the positions of the other parts corresponding to rotational symmetry are known, and therefore it is also possible to reduce measurement errors by measuring and averaging those parts.

2. The medial point P0' is moved and a new temporary medial point P1 is obtained. Then, probe paths L1r, L1t for this are obtained and stored in the measurement waiting probe path list 104. Considering that the curvature radius of the channel cross section of the feature model 107b is 10 mm or more, assume that the amount of movement is 3 mm, which is less than ½ thereof.

3. The virtual probe measuring means 105 measures the probe paths L1r, L1t, obtains a correct medial point P1' (not shown) and stores it in the measurement result list 106.

4. From the medial point P0' and medial point P1', a tangential plane of a medial plane C in the vicinity thereof is obtained.

5. The medial point P1' is moved to the opposite side of the medial point P0' and orthogonally projected to the tangential plane of the medial plane C obtained in the process 4 and a new temporary medial point P2 is obtained. Then, probe paths L2r, L2t corresponding thereto are obtained and stored in the measurement waiting probe path list 104.

6. The virtual probe measuring means 105 measures the probe paths L2r, L2t, obtains a correct medial point P2' (not shown) and stores in the measurement result list 106.

7. The above described respective processes 4 to 6 are repeated until no new medial point is obtained any longer.

Through the above described processes of the probe path setting means 108b and virtual probe measuring means 106, the measurement result list 106 stores coordinates of many medial points, tangential plane of the medial plane C in the vicinity of the respective medial points and channel widths t1 to tn at the respective medial points.

When the above described process is completed, the shape model generation means 109 of the fluid machinery component shape model generation system 100b rearranges the medial points stored in the measurement result list 106, links them with one another and outputs as curved plane data. If the curved plane data is output in a highly compatible format such as IGES, it can be used for a fluid analysis, etc., as a blade shape model.

Figure 12A:
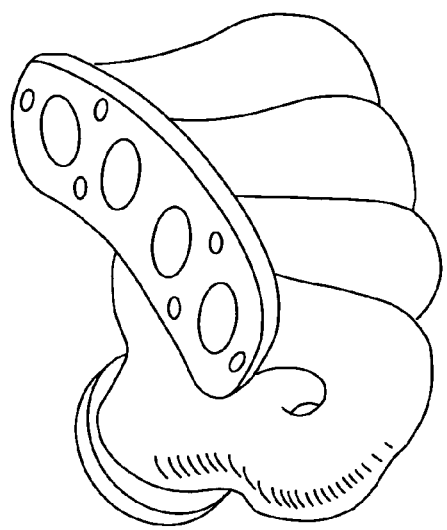
FIGS. 12A, 12B illustrate an appearance of a manifold and an example of X-ray CT data thereof.
Figure 12B:
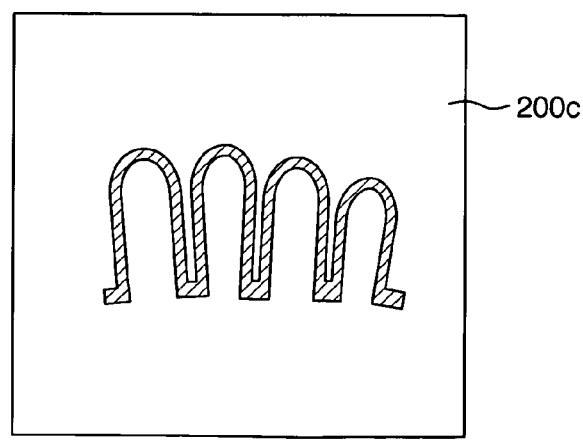
Figure 13:
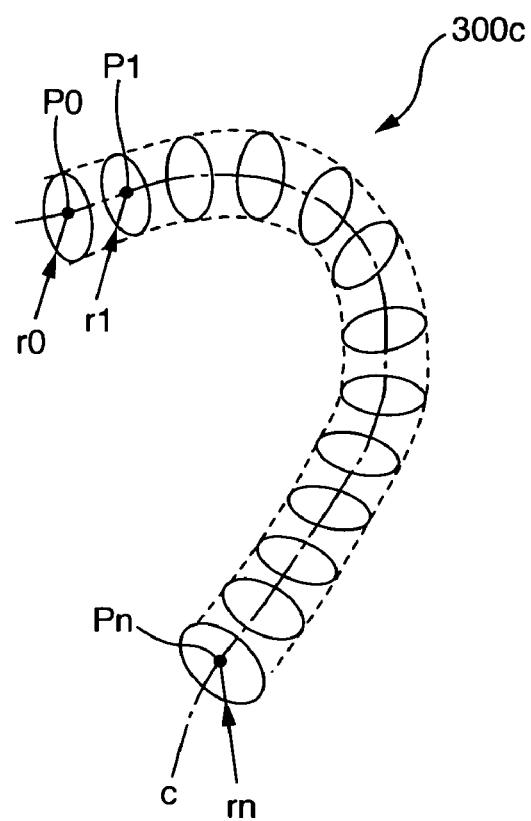
FIG. 13 illustrates an example of a manifold model.

Third Embodiment of Application Example;

A third embodiment is an example related to a pipeline component model generation system for generating a shape model, etc., of a manifold of an automobile engine. It is an object of the pipeline component model generation system to generate a manifold model 300c as shown in FIG. 13 from the X-ray CT data 200c (FIG. 12B) of a manifold (FIG. 12A) as shown in FIGS. 12A, 12B, for example. The manifold is a combination of pipes of a substantially fixed thickness and by tracking the center line of the pipeline, it is possible to generate a shape model that can be easily used. The present invention is effectively applicable to making full use of features of such a shape.

When a pipe is handled in CAD, it is a general practice to realize modeling using center point clouds P0 to Pn making up a center line C and the radiuses r0 to rn of the pipe at the respective center points, and therefore the manifold model 300c also complies with this.

Figure 14:
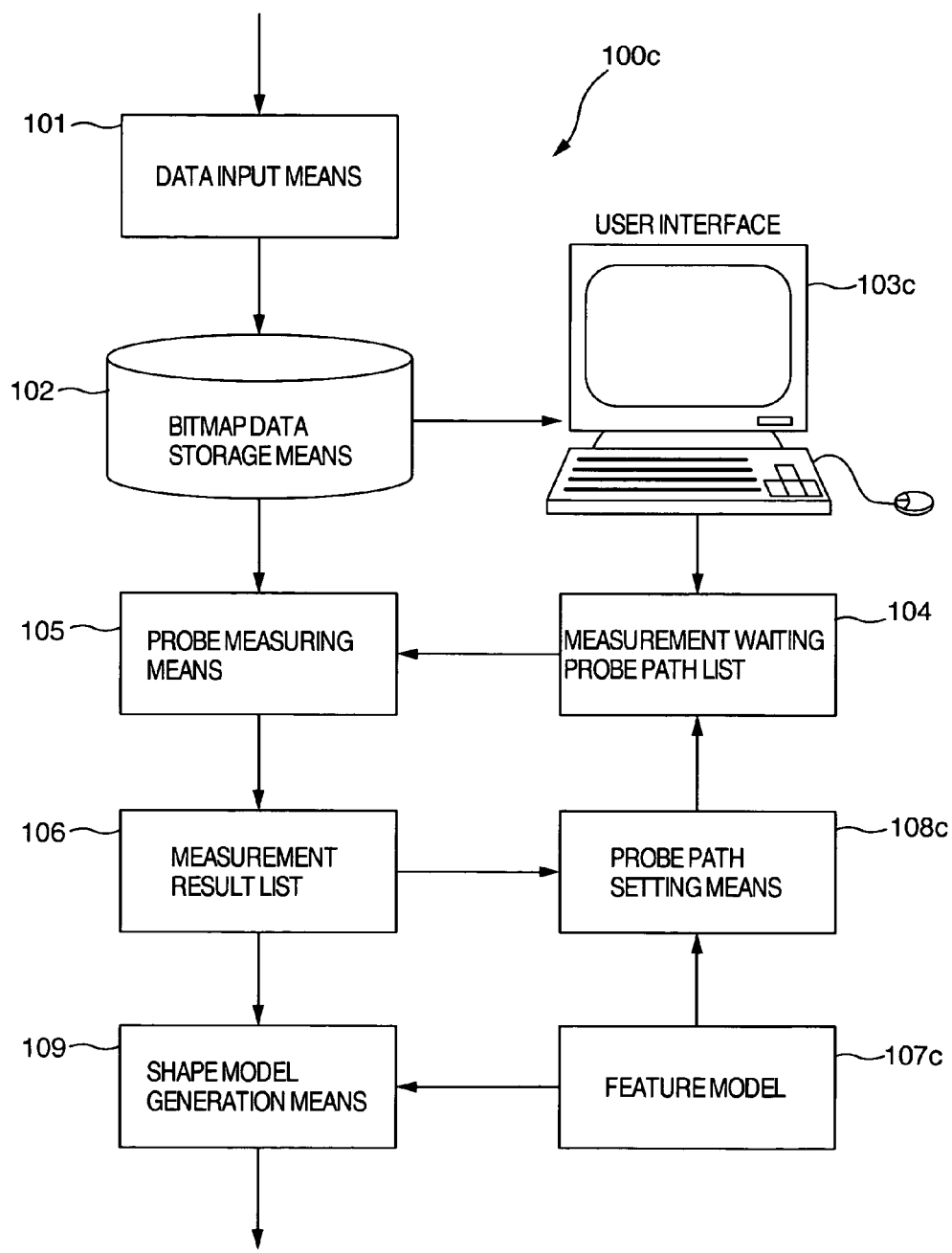
FIG. 14 illustrates the structure of a pipeline component model generation system.

FIG. 14 shows the structure of the pipeline component model generation system of this embodiment. The basic structure of this pipeline component model generation system 100c is the same as that of the shape model generation system 100. The following explanations will focus on the mounting specific to the pipeline component model generation system 100c.

Figure 15:
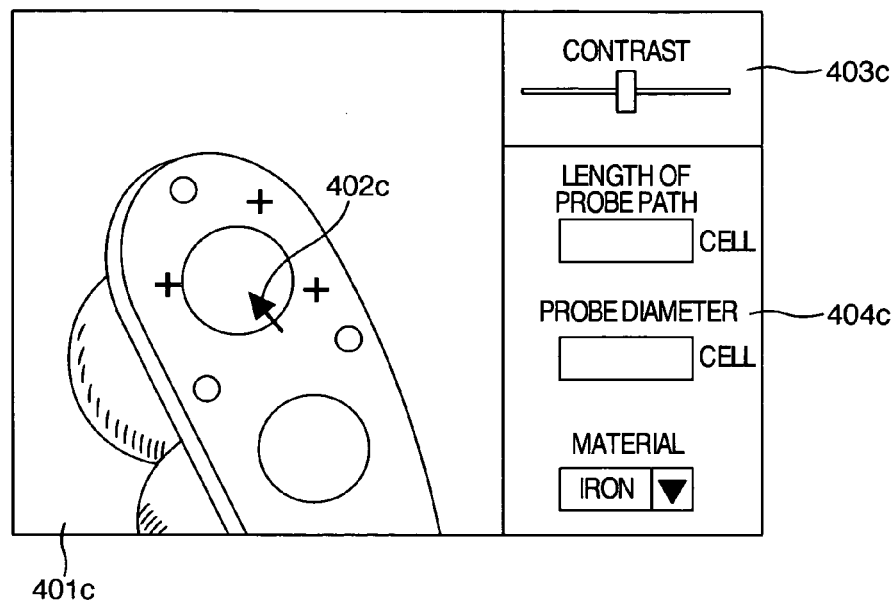
FIG. 15 illustrates an example of a screen displayed by a user interface of the pipeline component model generation system.

FIG. 15 shows an example of a screen displayed on a display by the user interface 103c of the pipeline component model generation system 100c. The display shows a rendering image 401c resulting from a volume-rendering of the X-ray CT data 200c. The user specifies three or more points on the end face flange plane of a pipe using a mouse cursor 402c while watching the rendering image 401c. Then, several visual lines are determined from two-dimensional coordinates on the screen of the specified points and rendering direction of the X-ray CT data 200a. The front-end processor searches for the surface of the object along these visual lines and finds out surface points. It is possible to know the end face flange plane using a least squares method. The user then specifies a point corresponding to the inlet of the pipe. When an intersection between the visual line obtained likewise and the end face flange plane is obtained, that is the three-dimensional position of the center point (medial point) at the pipe inlet. When the center point of the pipe inlet is determined in this way, it is possible to generate and set a first probe path which is parallel to the end face flange plane at a point (center point P0 in FIG. 16 which will be described later) to which the center point of the pipe inlet is slightly moved in the visual line direction.

The feature model 107c of the pipeline component model generation system 100c assumes, for example, the following features for the manifold which is the object:

1. The cross section of the pipe is substantially circular.
2. The orientation of the pipe does not change drastically and the first-order derivative is continuous on the inner plane.
3. The curvature radius of the pipe center line C is 30 mm or more.

These features are inevitably determined taking into consideration the conditions that should be furnished for the manifold of an automobile engine to function.

Figure 16:
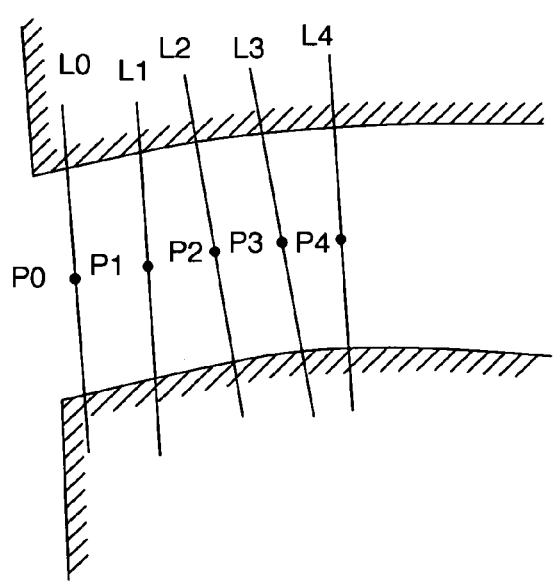
FIG. 16 illustrates a process by the probe path setting means of the pipeline component model generation system.

The probe path setting means 108c of the pipeline component model generation system 100c successively generates and sets probe paths based on the first probe path and feature model 107c set as described above. FIG. 16 will show the process.

1. The virtual probe measuring means 105 measures the first probe path L0 obtained from the center point P0, obtains a correct center point P0' (not shown) and stores it in the measurement result list 106.
2. The center point P0' is moved and a new temporary center point P1 is obtained. A probe path L1 for this center point P1 is obtained and stored in the measurement waiting probe path list 104. Considering that the curvature radius of the center line C in the feature model 107c is 30 mm or more, the amount of movement is set to 10 mm, less than ½ thereof.
3. The virtual probe measuring means 105 measures the probe path L1, obtains a correct center point P1' (not shown) and stores it in the measurement result list 106.
4. From the center point P0' and center point P1', a directional vector of the center line C in the vicinity thereof is obtained.
5. The center point P1' is moved to the opposite side of the center point P0' and orthogonally projected to the center line C to obtain a new temporary center point P2. A probe path L2 for this center point P2 is obtained and stored in the measurement waiting probe path list 104.
6. The virtual probe measuring means 105 measures the probe path L2, obtains a correct center point P2' (not shown) and stores it in the measurement result list 106.
7. The above described processes 4 to 6 are repeated until no new center point is obtained any longer.

Through the above described processes of the probe path setting means 108c and virtual probe measuring means 106, the measurement result list 106 stores many coordinates of center points and directional vectors of the center line C in the vicinity of the respective center points and radiuses r0 to rn of the pipe at the respective center points.

When the above described process is completed, the shape model generation means 109 of the pipeline component model generation system 100c rearranges the center points stored in the measurement result list 106, links them with one another and outputs as curve data. When the curve data is output in a highly compatible format such as IGES, it can be used for a finite element analysis, etc., as a manifold model.

Fourth Embodiment of Application;

The fourth embodiment is an example related to a hybrid material model generation system for generating a shape model of a hybrid material made of a plurality of different materials. An X-ray CT can acquire information on a density, and can thereby distinguish between different materials but the boundary includes defocusing, it is difficult to extract the surface position correctly. To generate a 3-D shape model, a polygon model is generated using a technique of boundary modeling such as a conventional marching cube method. However, this method determines a boundary according to a preset threshold, and so it is difficult to model a hybrid material in which a plurality of boundary thresholds exist. It is an object of the hybrid material model generation system to accurately generate a polygon model having a surface shape of a specific material or all materials for the shape of the hybrid material using X-ray CT data captured using an X-ray CT device. In this case, modeling is possible even if each of the different materials is thin. Therefore, using this method also makes it possible to generate a shell model as shown in the first embodiment.

Figure 17:
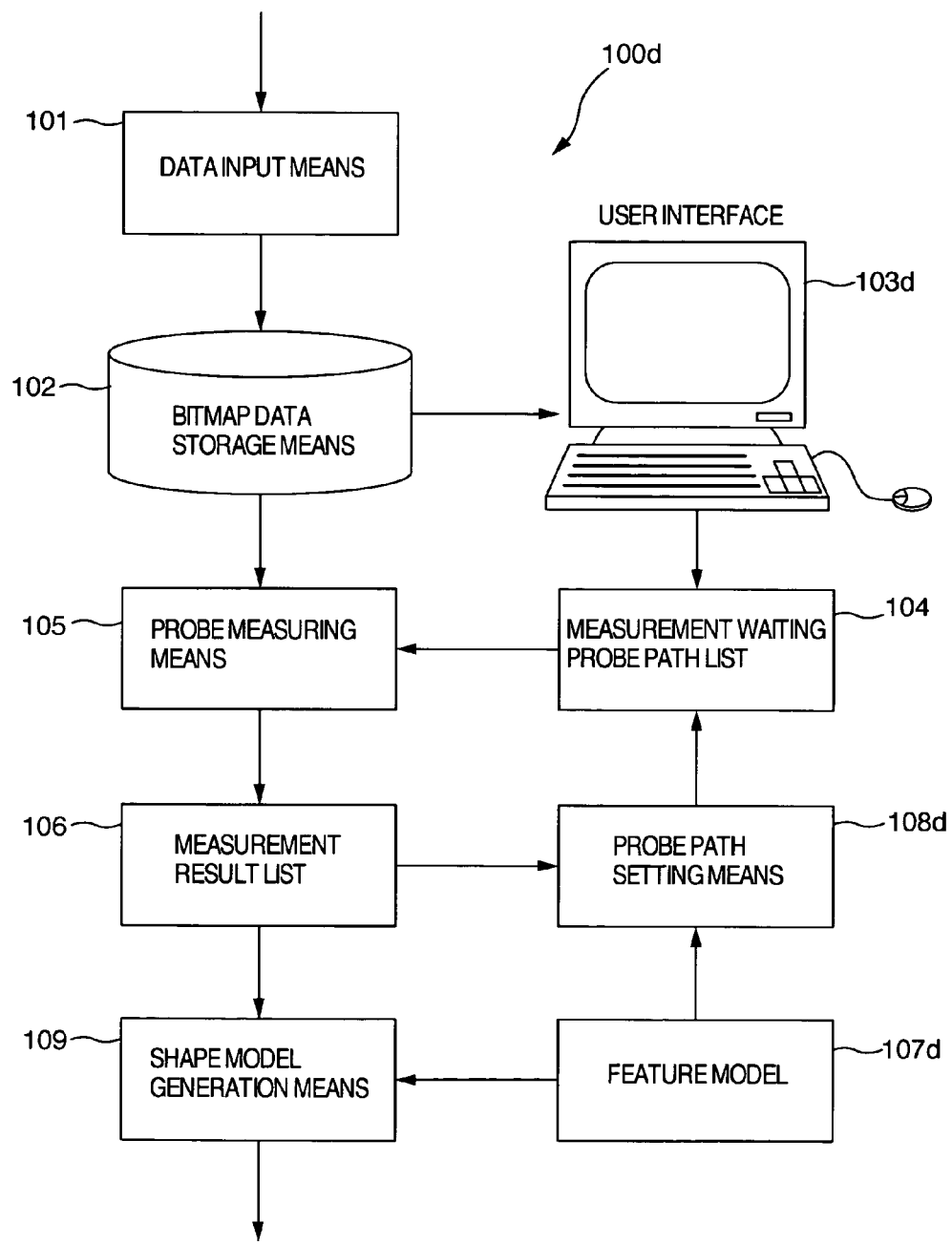
FIG. 17 illustrates the structure of a hybrid material shape model generation system.

FIG. 17 shows the structure of a hybrid material shape model generation system of this embodiment. The basic structure of this hybrid material shape model generation system 100d is the same as that of the shape model generation system 100. The following explanations will focus on the mounting specific to the hybrid material shape model generation system 100d.

The display of the user interface 103d of the hybrid material shape model generation system 100d displays an image of X-ray CT data obtained from a hybrid material to be subjected to shape modeling. The user specifies a part of the material to be extracted using a mouse cursor while watching the image on the display. When a shape model is generated for the entire data, the part can also be specified by the material without using the mouse.

The feature model 107d of the hybrid material shape model generation system 100d assumes features such as a material and average cell value of each material for each material of the hybrid material which is the object. Furthermore, it is also possible to assume continuity among different materials determined in consideration of the manufacturing process of the hybrid material.

Figure 18:
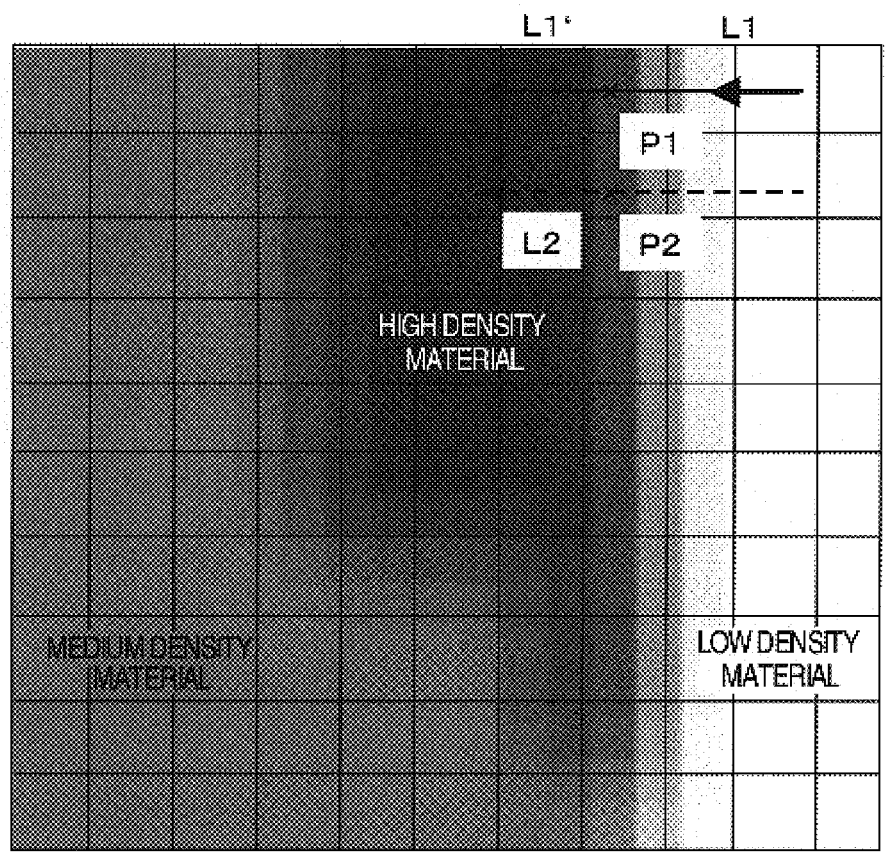
FIG. 18 illustrates a process modification of the probe path setting means in the hybrid material shape model generation system.

The probe path setting means 108d of the hybrid material shape model generation system 100d successively generates probe paths based on a first probe path and feature model 107d. FIG. 18 will show the process.

1. A first probe path L1 is set by the user's specification or an automatic search of the nearby cells. When there is a difference equal to or greater than a predetermined cell value on the probe path, the probe path is extended until both ends of the probe path show an average cell value of each material and a probe path L1' is generated. When the average cell value of each material is not shown even if the probe path is extended by 5 to 10 cells, the angle of the probe path is changed and the probe path L1' which satisfies the above described condition is searched. At this time, three or more different types of materials are included in the probe path in the following cases, and therefore "measurement of different materials" in virtual probe measurement is applied and surface positions of a thin material are measured accurately. The "measurement of different materials" is explained in detail in Japanese Patent No. 3431022.

(a) There are cell values higher or lower than the cell value of each cell at both ends of the probe path.

(b) Even if the angle of the probe path is adjusted so as to minimize the length of the probe path, the length of the probe path becomes equal to or greater than 10 to 15 cells.

2. Next, the probe path L1' is measured and point P1 on the surface of the material of the hybrid material is obtained.

3. The probe path L1' is slightly translated, a probe path L2 is obtained and stored in the measurement waiting probe path list 104. The amount of translation is determined with reference to the feature data 107d.

4. The virtual probe measuring means 105 measures the probe path L2, obtains a point P2 on the surface and stores it in the measurement result list 106.

5. The above described processes 1 to 4 are repeated for the hybrid material for the material specified by the user and all materials.

Through the above described processes of the probe path setting means 108d and virtual probe measuring means 106, coordinates of many surface positions are stored in the measurement result list 106. The processes 1 to 5 show examples where all boundary planes of all materials are obtained, but it is also possible to obtain only the surface of the specific material by adding detection when an average cell value of each material is searched in the process 1.

When the above described processes are completed, the shape model generation means 109 of the hybrid material shape model generation system 100d rearranges coordinates of the surface positions stored in the measurement result list 106, links them with one another and outputs as curved plane data. When the curved plane data is output in a highly compatible format such as polygon data or IGES, it can be used for a finite-element analysis, etc.

Another general embodiment when implementing the present invention will be explained below. In the above described embodiments, the probe paths are successively generated and set based on the first probe path set through the intervention of the user using the user interface and the feature model. In this general embodiment, all necessary probe paths can be set collectively. However, the setting is performed by updating a plurality of temporary probe paths which have been collectively set based on the characteristic values, etc., obtained through measurement of the respective temporary probes and repeating this update until a certain convergence condition is satisfied and obtaining the final probe path.

Figure 19:
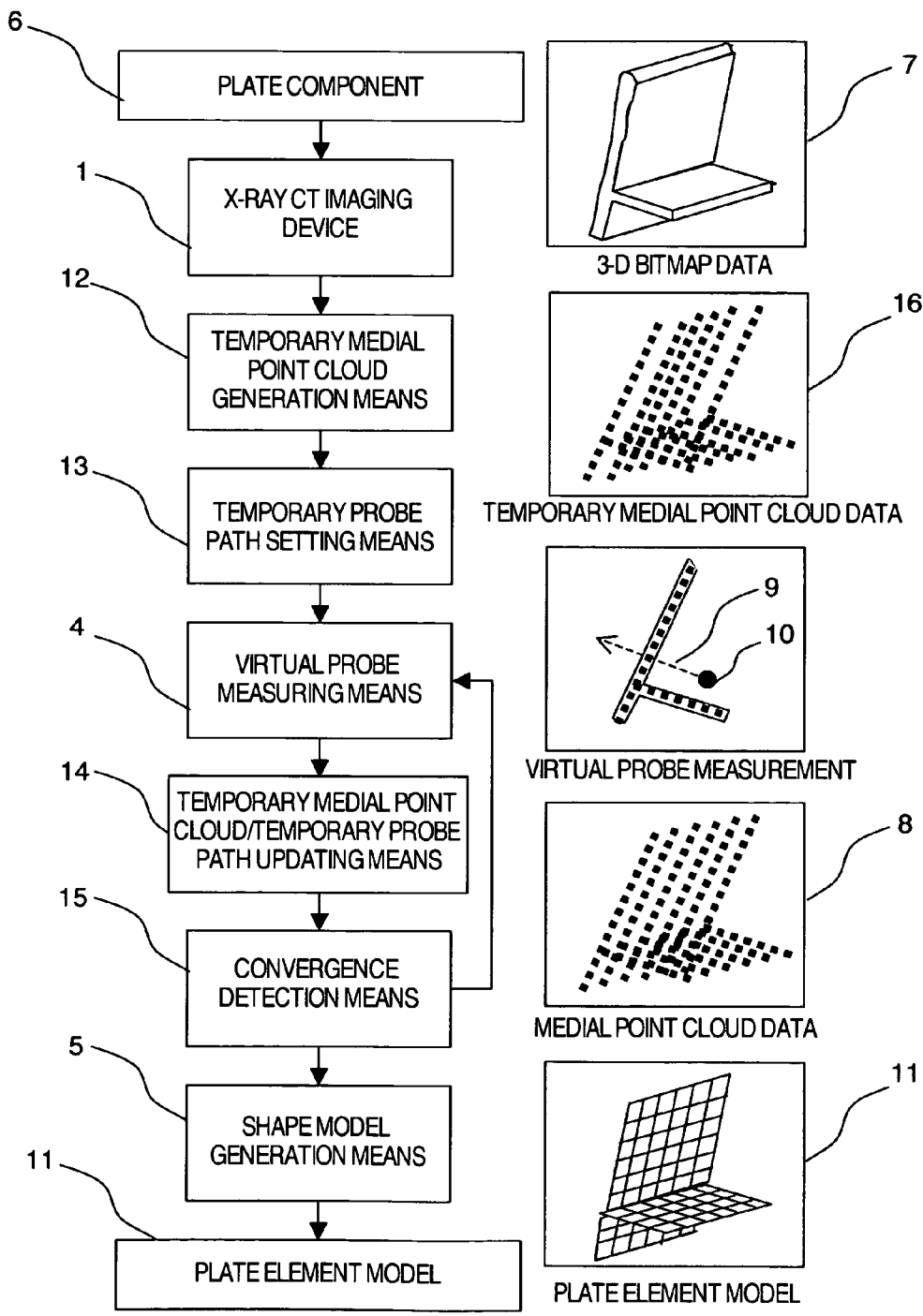
FIG. 19 illustrates the structure of another shape model generation system according to a general embodiment of the present invention.

FIG. 19 shows the structure of a shape model generation system according to this embodiment. This shape model generation system is provided with an X-ray CT imaging device 1, temporary medial point cloud generation means 12, temporary probe path setting means 13, virtual probe measuring means 4, temporary medial point cloud/temporary probe path updating means 14, convergence detection means 15 and shape model generation means 5. Such a shape model generation system allows shape models of various objects to be generated as shown in the above described example. For more specific explanation, the explanation will assume a case of an object which is a plate component made up of a plate element. As explained above, when a thin object such as a sheet metal is handled in CAD, it is a general practice to realize modeling using medial point clouds making up a medial plane and thickness at each medial point, and therefore the following explanations will also comply with this.

The X-ray CT imaging device 1 picks up a plurality of tomographic images of the plate component 6 made up of a plate element and generates X-ray CT data (3-D bitmap data) 7 including the plate component 6.

The temporary medial point cloud generation means 12 generates temporary medial point cloud data 16 with respect to inner points located inside the plate component 6, or more specifically medial points from the X-ray CT data 7.

The temporary probe path setting means 13 sets temporary probe paths for measuring the thickness of the plate element at the respective medial points and center positions in the thickness direction for the respective medial points of the temporary medial point cloud 16 in such a way that the temporary probe paths pass through the corresponding medial points.

The virtual probe measuring means 4 causes the virtual probe 10 to perform scanning along a temporary probe path set by the temporary probe path setting means 13 and a new temporary probe path updated/set by the temporary medial point cloud/temporary probe path updating means 14 and carries out virtual probe measurement. The measurement is intended to obtain the thickness of the plate element at each temporary medial point and center position in the thickness direction.

The temporary medial point cloud/temporary probe path updating means 14 updates temporary medial point clouds at the center positions of the plate element measured by the virtual probe measuring means 4 and updates/sets temporary probe paths for measuring the thickness of the plate element at the respective new temporary medial point clouds obtained by this update.

The convergence detection means 15 performs convergence detection of the medial points or temporary probe paths updated by the temporary medial point cloud/temporary probe path updating means 14. The convergence detection is performed on a change of the position of each updated temporary medial point and a change of a vector of a temporary probe path set at each updated temporary medial point. That is, it is detected whether the position of the updated temporary medial point has changed with respect to the temporary medial point before the update by a certain value or more or the vector of the temporary probe path set at the updated temporary medial point has changed with respect to the vector of the temporary probe path at the temporary medial point before the update by a predetermined value or more. When a change by a predetermined value or more is detected by this convergence detection, the data is handed over to the virtual probe measuring means 4 and temporary medial point cloud/temporary probe path updating means 14 and the above described process is repeated until the detection result by the convergence detection means 15 shows that "there is no change by a predetermined value or more." When the convergence detection means 15 detects that "there is no change by a predetermined value or more," the temporary medial point cloud at that time is regarded as a true medial point cloud 8 and the plate thickness associated with each medial point of the medial point cloud 8 is regarded as the true plate thickness. The shape model generation means 5 generates a shape model having information on the plate thickness, or more specifically, the plate element model 11 from the medial point cloud data 8 and the plate thickness measured by the virtual probe measuring means 4.

FIGS. 20A to 20E show a process flow in an example of the method whereby the temporary medial point cloud generation means 12 automatically calculates a temporary medial point cloud. The temporary medial point cloud generation method (temporary medial point cloud extraction method) in this embodiment includes an object inner cell extraction process 17, a nearby cell reference process 18, a nearby cell center point calculation process 19 and a point cloud puncturing process 20.

Figure 20A:
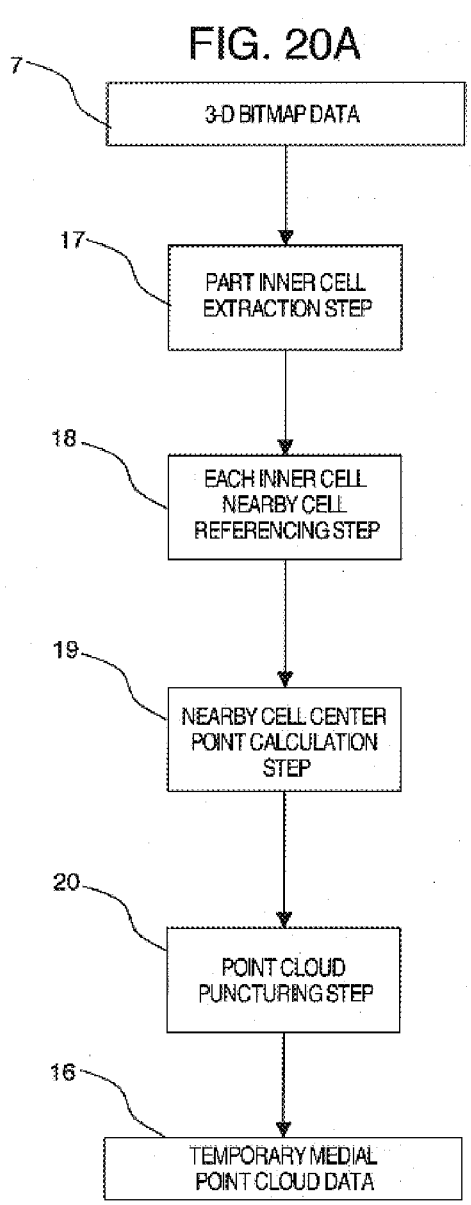
FIGS. 20A to 20E illustrate a process flow in an example of a method whereby the temporary medial point cloud generation means automatically obtains a temporary medial point cloud.
Figure 20B:
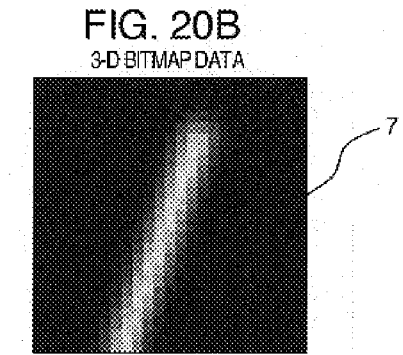
Figure 20C:
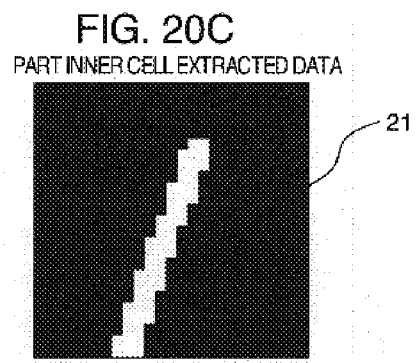
Figure 20D:
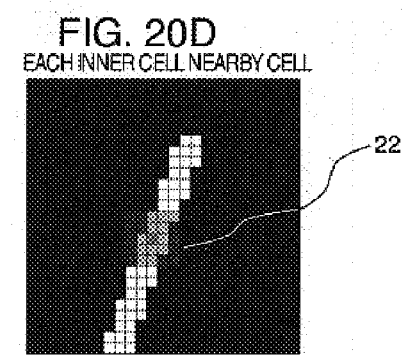
Figure 20E:
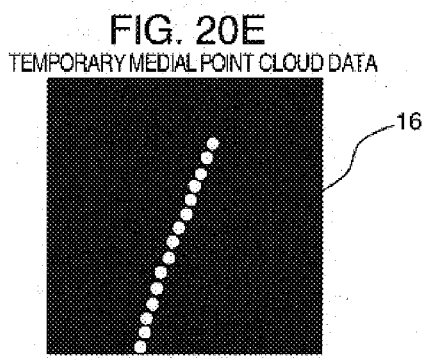

The object inner cell extraction process 17 binarizes the X-ray CT data 7 in FIG. 19 to thereby extract the object inner cell 21 (white area in FIG. 20C). It is also possible to adjust the quantity of inner cells 21 to be extracted to an appropriate value by adjusting a threshold for binarization at this time.

The nearby cell reference process 18 references the cell 22 (part shown with shading in FIG. 20D) in the vicinity of each inner cell 21. The vicinity range is defined as a range of a predetermined distance from each inner cell 21. The predetermined distance is determined to be, for example, within 2 cells from each inner cell 21. Furthermore, the predetermined distance may also be locally determined as the distance including an outer cell. Furthermore, the predetermined distance may also be determined based on the plate thickness of the plate element input by the user.

The center point calculation process 19 of the nearby cell calculates the center point of the nearby cell 22 referenced in the nearby cell reference process 18. Then, this calculated center point is regarded as the temporary medial point in the temporary medial point cloud data 16. One of methods of calculating the center points is to obtain the positions of the centers of gravity of the inner cell group within the nearby cell 22 which can include not only an inner cell but also an outer cell. It is also possible to calculate the center points through weighting with a CT value of each cell.

The point cloud puncturing process 20 merges the central point cloud obtained through the center point calculation process of the nearby cell 22 with overlapping points or extremely nearby points. The value which defines the extreme neighborhood may also be determined by the user's input.

Through the above described series of processes, it is possible to automatically generate the temporary medial point cloud data 16 through the X-ray CT data 7 in FIG. 19.

Figure 21A:
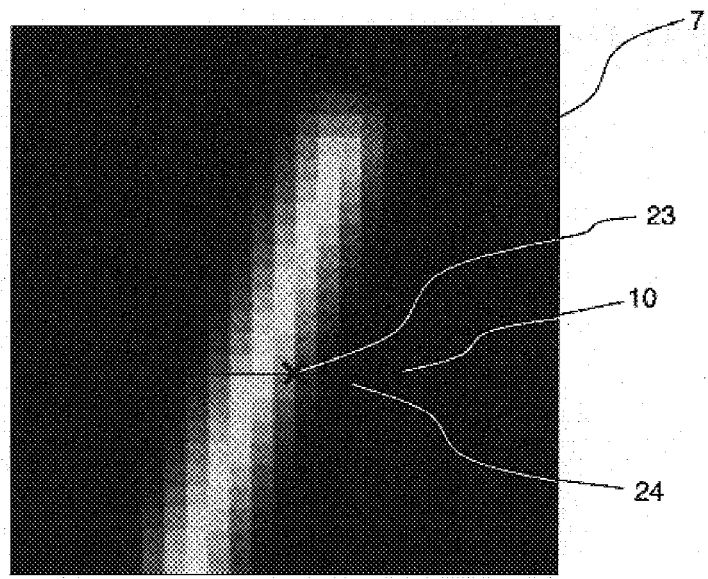
FIGS. 21A, 21B illustrate a conceptual rendering of a process of updating a temporary medial point cloud and temporary probe path.
Figure 21B:
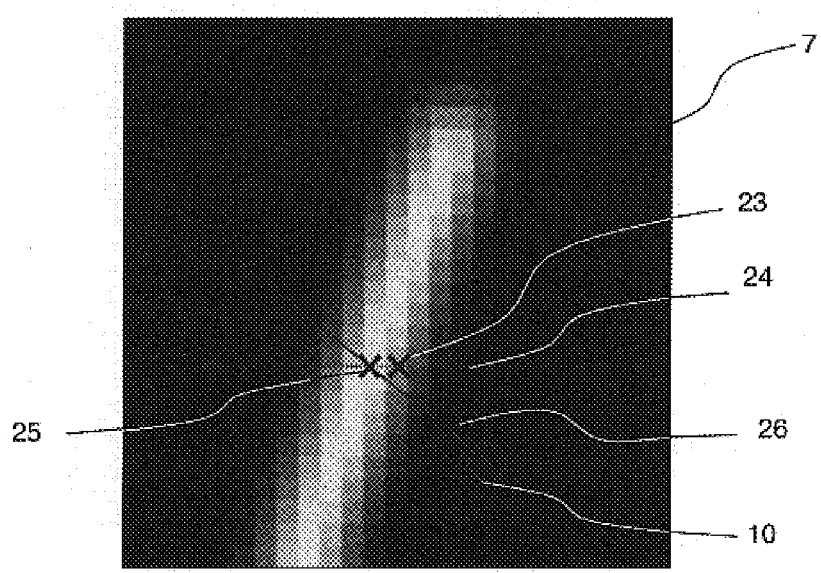

FIGS. 21A, 21B show a conceptual rendering of a process of updating the temporary medial point cloud and temporary probe path. To update the temporary medial point cloud and temporary probe path, the virtual probe measuring means 4 causes the virtual probe 10 to scan along the temporary probe path 24 set for the temporary medial point 23 before the update and calculates the thickness of the plate element and the center position (FIG. 21A). Next, the position of the temporary medial point is set to the center position of the plate element obtained through virtual probe measurement and regarded as a new temporary medial point 25. Finally, a new temporary probe path 26 which passes through a new temporary medial point 25 is set (FIG. 21B).

The temporary probe path 26 has an orientation and length. The orientation of the temporary probe path 26 can be set, for example, as a normal vector of the plane formed by the temporary medial point cloud close to the temporary medial point 25. The normal vector may be obtained as a normal vector of an approximate plane with respect to a nearby point or by obtaining a position vector of each point close to a point of attention as the origin and calculating an average of all outer product vectors. The latter method is also effective in calculating an approximate plane normal vector from the X-ray CT data through weighting with a cell value. Aside from these methods, the orientation of the new temporary probe path in updating may also be searched and calculated in such a way that the plate thickness becomes a minimum relative to the value before the update.

The length of the temporary probe path 26 is generally set 2 to 8 times the distance between the referenced nearby cells or set to 2 to 8 times the plate thickness input by the user.

FIG. 22 shows a conceptual rendering of a process of measuring the medial point of the plate component and plate thickness using the virtual probe. This measurement complies with the width measurement method known in Japanese Patent No. 3431022. The upper part in FIG. 22 shows a scanning procedure of the virtual probe 10 in the X-ray CT data 7 and the graph below shows a relationship between the position of the virtual probe and CT value. The virtual probe 10 scans along the probe path 9 in the X-ray CT data 7. Through the scanning, a CT value (cell value) on each cell included in the virtual probe 10 defined as the above described area having a finite area or volume is obtained. At this time, it is also possible to improve the accuracy of data by scanning the virtual probe 10 back and forth. The relationship between the position of the virtual probe shown in the figure and the CT value included in the virtual probe is measured in this way. The graph below shows this measurement value plotted at positions of the probe path. The solid line 27 shows a CT value measured at the position of the virtual probe and two bold dotted lines 28 show the surfaces of the actual plate component. The graph shows an example where the area to be measured consists of air, plate component and air from left to right at positions of the virtual probe.

The thickness of the plate component is calculated using the following procedure. First, a CT value 29 indicating a density of the plate component and a CT value 30 indicating a density of air are calculated. The CT value 29 is calculated by acquiring CT values corresponding to a portion where the same material as the plate component occupies a wide area of several tens of cells and averaging the CT values. Next, the area of a region 31 enclosed by a thin dotted line indicating a CT value 30 and the solid line 27 is calculated. In this case, the solid line 27 corresponds to the defocusing of the bold dotted line 28 according to a Gaussian function, and therefore the area of the region 31 is equal to the area of a region 32 enclosed by a thin dotted line indicating the CT value 29, thin dotted line indicating the CT value 30 and bold dotted line 28. Using this relationship, the thickness 33 of the plate component is calculated as thickness 33=(area of region 31)/(CT value 29–CT value 30). The medial point position 34 may be calculated by scanning the overall probe path using the virtual probe, calculating the area of the region 31, rescanning and finding out the position where the total area calculated by the virtual probe becomes ½ of the area of the region 31. By so doing, even when the plate component is thin, it is possible to measure the medial point, thickness, and boundary position of this thin plate component with high precision on the order equal to or smaller than the cell width.

Figure 23:
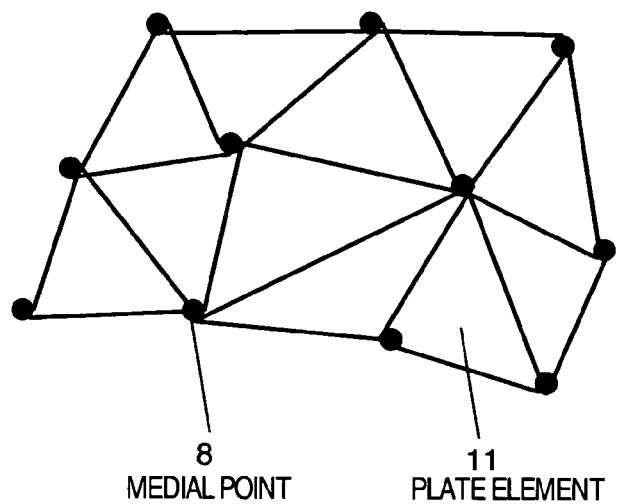
FIG. 23 illustrates a conceptual rendering of an example of a process of generating a plate element model from a measured medial point cloud and plate thickness.

FIG. 23 shows a conceptual rendering of an example of a process through which a plate element model is generated from the measured medial point cloud and plate thickness. For each medial point 8 of the medial point cloud measured by the virtual probe measuring means, a plane element (plate element) 11 made up of two neighboring points is generated and this plane element generated is associated with the measured plate thickness. At this time, it is also possible to preferentially link between points having similar vector orientations of the probe path used by the virtual probe measuring means. Furthermore, for the plate thickness associated with the plane element, for example, an average of the plate thickness of each point making up the plane is set, but at this time, if only plate thicknesses of points having similar vector orientations of the probe path used by the virtual probe measuring means are used to calculate an average, it is also possible to realize modeling of a bend section, etc., of the plate accurately.

Figure 24:
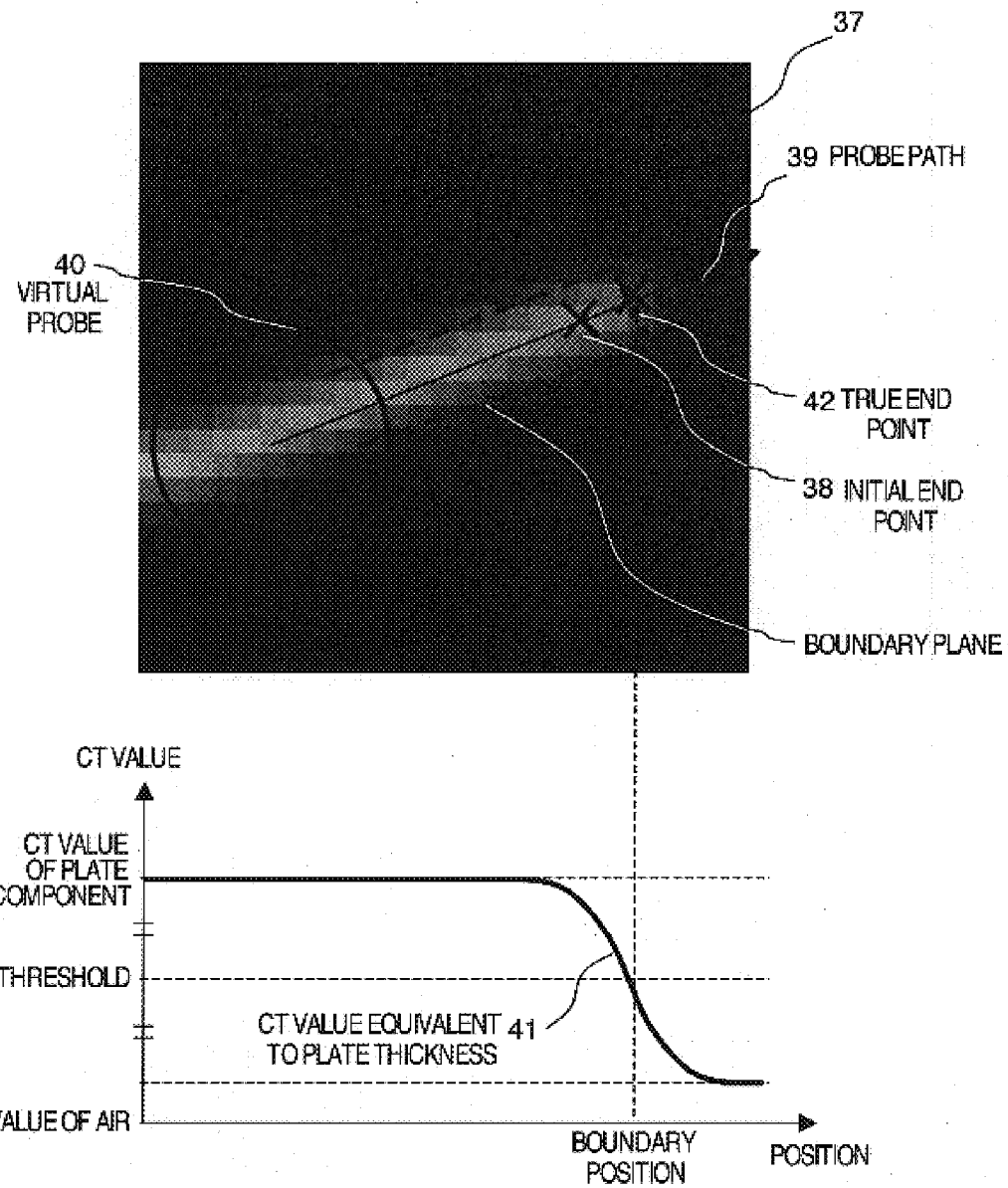
FIG. 24 illustrates a conceptual rendering of an example of a process in a method of obtaining a medial point cloud of edges of a plate component.

FIG. 24 shows a conceptual rendering of an example of a process of obtaining a medial point cloud of edges of a plate component. Reference numeral 37 in the figure denotes a cross section of a plate component of edges in X-ray CT data. In this method, a medial point cloud and plate thickness are obtained using the present invention or other method first and then X-ray CT data generated using an X-ray CT imaging device is used. First, a probe path 39 is defined about an initial edge medial point (end point) 38. The probe path 39 is defined as the one that satisfies three conditions of being parallel to the plate element to which the medial point 38 belongs, being perpendicular to the edge to which the medial point 38 belongs and passing through the medial point 38. The length of the probe path 39 extends to the air part outside the edges. Next, a virtual probe 40 in size 2 to 8 times the plate thickness of the plate element to which the medial point 38 belongs is defined. The virtual-probe 40 scans along the probe path 39, calculates the total CT value of X-ray CT data inside the virtual probe at each position and calculates a CT value equivalent to the plate thickness. This is opposite to the method explained using FIG. 22 whereby the plate thickness is calculated from the CT value of the plate component. Using this method, a profile 41 having a CT value equivalent to the plate thickness in the probe path is obtained. Here, at the edges of the plate, the CT value drops according to a Gaussian function due to defocusing of the image. Therefore, it is possible to obtain a true medial point (end point) 42 using the CT value indicating a density of the plate component and an average of the CT value indicating a density of air as thresholds. This makes it possible to generate a plate element model with edges with high accuracy.

Figure 25:
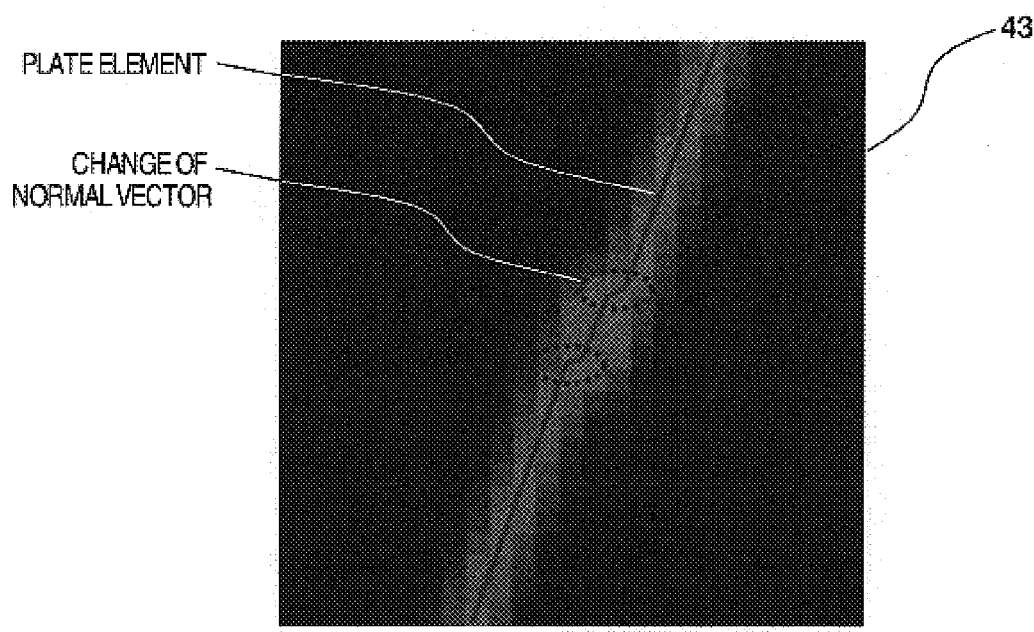
FIG. 25 illustrates a conceptual rendering of an example of a process of obtaining a medial point cloud at joint parts of the plate.

FIG. 25 shows a conceptual rendering of an example of a process when a medial point cloud is calculated at a joint part of a plate. Reference numeral 43 in the figure denotes a cross section of a joint part of a plate component in X-ray CT data. The solid line denotes a plate element group generated using the method explained in FIG. 22. In this plate element group, the joint part of two plates is defined as a part having a plate thickness twice the actual plate thickness. Here, the normal vector of the plate element at the joint part is equal to the normal vector of a nearby one-sheet plate. On the other hand, the boundary between the one-sheet plate and joint part indicated by a dotted line has a different normal vector, and therefore the joint part can be extracted taking note of this position. For example, it is possible to use a method of examining elements close to the noted position and extending the element having a smaller plate thickness when the elements have the same normal vector.

As described above, the present invention is designed to obtain data for shape modeling using a virtual probe measurement from shape description data such as X-ray CT data. This is equivalent to obtaining data for shape modeling from within an object by making full use of features of shape description data such as X-ray CT data which can even convert the inner shape of the object to data. For this reason, it is possible to effectively solve the above described various problems in the conventional method of obtaining data for shape modeling by converting X-ray CT data to point cloud data. For example, it is possible to easily realize shape modeling of an object including a thin plate element having a thickness on the order of defocusing expansions or even smaller in X-ray CT data. Furthermore, since X-ray CT data need not be converted to point cloud data, it is possible to realize shape modeling making full use of shape features of the object. Furthermore, the surface of the plate element can be detected by changing a CT value profile and the threshold need not be used, and therefore it is possible to easily generate a shape model even for a hybrid material made up of a plurality of different materials.

Furthermore, the present invention allows the probe path setting means to automatically set many probe paths required in virtual probe measurement, except the first probe path or all of them. This drastically reduces the user's burden and further improves the ease of use.

Furthermore, the present invention carries out an extrapolation process which also uses a feature model to sequentially generate probe paths. This considerably simplifies the arrangement of the first probe path set by the user and only requires the user to perform a simple operation of specifying one point on the screen.

Figure 26:
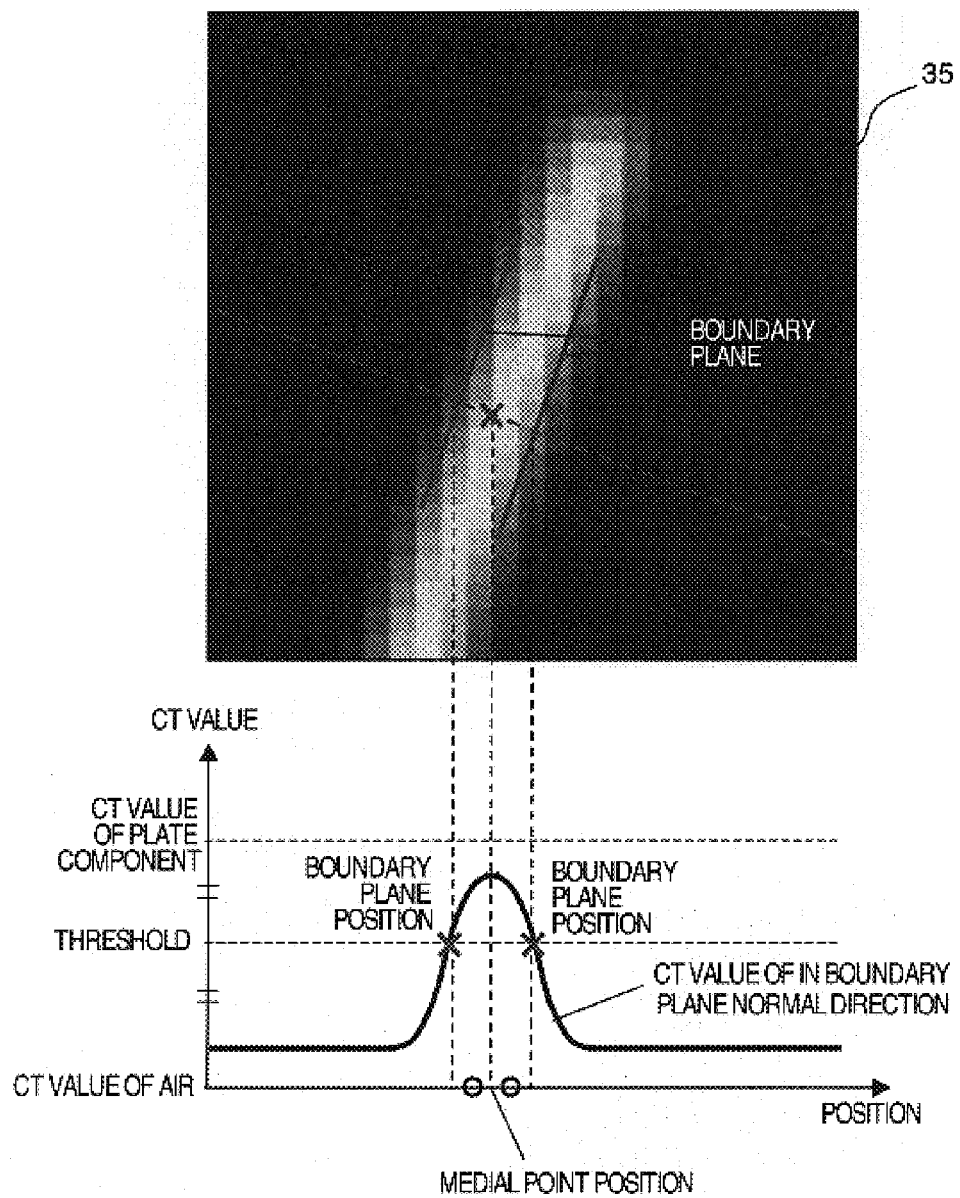
FIG. 26 illustrates a conceptual rendering of a typical process in a conventional method.

To contribute to an understanding of the effects of the present invention, a summary of a conventional method of obtaining the surface positions of a plate component and then obtaining its medial point and plate thickness will be explained. FIG. 26 shows an example of a conceptual rendering of a typical process in the conventional method. The upper part indicated by reference numeral 35 in the figure is a cross section of a plate component in X-ray CT data. The graph below shows a CT value profile at the position of the dotted line in the cross section data 35 of the plate component. The conventional method sets the position of the plate surface using a predetermined threshold first. In the case of a 3-D shape, the plate surface is modeled using, for example, a marching cube method. When the plate surface is a boundary between the plate component and air, the threshold used here is an average of a CT value indicating a density of the plate component and a CT value indicating a density of the air. Next, suppose the center of the positions of the front and back planes of the plate component is a medial point and the distance between the front and back planes at the position of the medial point is the plate thickness. At this time, the medial point and plate thickness are obtained using, for example, the respective normals to the front and back planes. Therefore, obtaining the position of the plate surface accurately is essential in the conventional method. However, as the CT value profile shown here, if the value falls short of the CT value indicating the density of the plate component even at the position equivalent to the inside of the plate component, the aforementioned threshold does not indicate the correct position of the boundary and reduces the measurement accuracy of the plate thickness.

Figure 27:
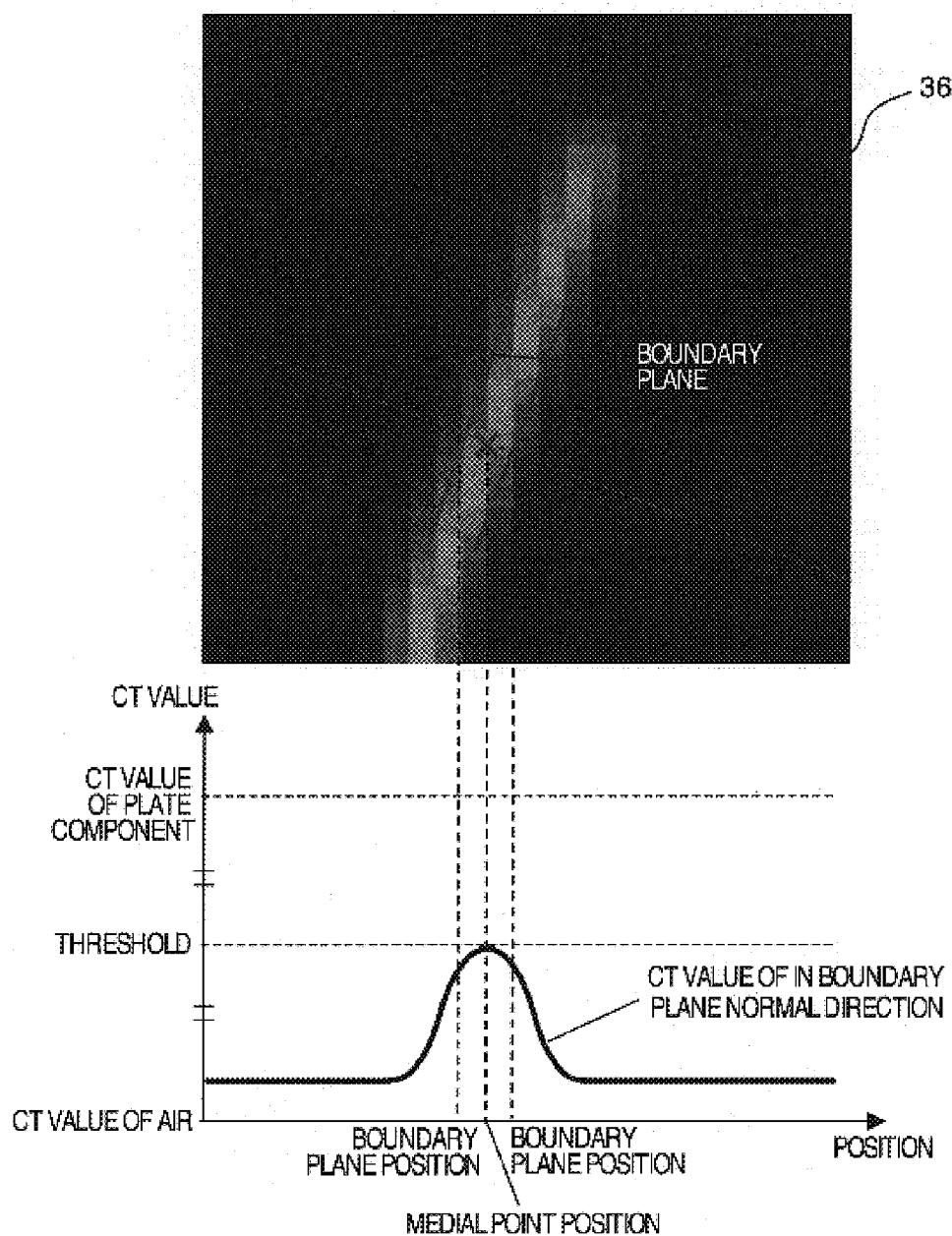
FIG. 27 illustrates an example of X-ray CT imaging data of a plate component which cannot be modeled using a conventional method.

FIG. 27 shows an example of X-ray CT imaging data of a plate component which cannot be modeled using the conventional method. The upper part indicated by reference numeral 36 in the figure is a cross section of the plate component in the X-ray CT data. The graph below shows a CT value profile at the position of the dotted line in the cross section data 36 of the plate component. A difference from the data 35 shown in FIG. 26 is that the original plate component is very thin. As shown in the graph, since the plate component is very thin, the CT value of the plate component even falls short of an average of the CT value indicating a density of the plate component and the CT value indicating a density of the air. Such a state can appear, for example, when the thickness of the plate component is, for example, not more than 2 cells. In this case, it is not possible to obtain the position of the plate surface using a predetermined threshold. Therefore, since it is not possible to obtain the position of the plate surface, it is possible to obtain neither the medial point nor the plate thickness, and so it is not possible to realize shape modeling of the plate component.

As shown above, it is difficult to realize shape modeling of a plate component which is thinner than a predetermined value using the conventional method. On the contrary, the method of the present invention described above can calculate a plate thickness if there is a change in the CT value profile, and can thereby realize modeling of a plate component even when the plate thickness is equal to or smaller than the cell size.

The present invention relates to generation of a shape model from shape description data such as X-ray CT data and has the effect of expanding the range of objects to which the shape modeling is applicable, etc., and the present invention can be widely used in the field of digital engineering using CAD.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. The shape model generation method for generating a shape model of an object from data acquired for the object to describe the shape of the object, comprising:
   a process by virtual probe measuring means of causing a virtual probe defined as an area having a finite expansion in a virtual space in said shape description data to sequentially scan a plurality of probe paths sequentially set by probe path setting means, measuring said shape description data and thereby acquiring a characteristic value specific to the position in said virtual space of said virtual probe for each of said probe paths; and
   a process by the probe path setting means of generating a new probe path using said characteristic value obtained for said probe paths and thereby sequentially setting said plurality of probe paths,
   wherein when a shell model is generated for an object including a plate element, said virtual probe measuring means acquires the position of a medial point of said plate element in the thickness direction as said characteristic value from said shape description data to generate said new probe path using the acquired medial point.

2. The shape model generation method according to claim 1, further comprising:
   a process of extracting a medial point at an edge of said plate element;
   a process of setting a probe path which is parallel to the plane of said plate element at said edge medial point and perpendicular to the end face of said edge and passes through said edge medial point; and
   a process of carrying out measurement using said virtual probe measuring means along the probe path which passes through said edge medial point and obtaining a true edge medial point.

3. The shape model generation method according to claim 1, further comprising, when the plate element includes a joint part, a process of extracting a medial point at which the thickness of said plate element and a normal vector of said plate element which are said characteristic values obtained through the measurement by said virtual probe measuring means with respect to said medial point differ from the thickness of said plate element and the normal vector of said plate element in the vicinity of said medial point by a predetermined value or greater and thereby detecting said joint part.

4. The shape model generation method according to claim 2, further comprising, when the plate element includes a joint part, a process of extracting a medial point at which the thickness of said plate element and a normal vector of said plate element which are said characteristic values obtained through the measurement by said virtual probe measuring means with respect to said medial point differ from the thickness of said plate element and the normal vector of said plate element in the vicinity of said medial point by a predetermined value or greater and thereby detecting said joint part.

5. The shape model generation method for generating a shape model of an object from data acquired for the object to describe the shape of the object, comprising:
   a process by virtual probe measuring means of causing a virtual probe defined as an area having a finite expansion in a virtual space in said shape description data to sequentially scan a plurality of probe paths sequentially set by probe path setting means, measuring said shape description data and thereby acquiring a characteristic value specific to the position in said virtual space of said virtual probe for each of said probe paths; and
   a process by the probe path setting means of generating a new probe path using said characteristic value obtained for said probe paths and thereby sequentially setting said plurality of probe paths,
   wherein when a shape model of a fluid machinery component is generated, said virtual probe measuring means acquires the position of a medial point on a cross section of a channel of said fluid machinery component as said characteristic value from said shape description data and generates said new probe path using the acquired medial point.

6. The shape model generation method for generating a shape model of an object from data acquired for the object to describe the shape of the object, comprising:
   a process by virtual probe measuring means of causing a virtual probe defined as an area having a finite expansion in a virtual space in said shape description data to sequentially scan a plurality of probe paths sequentially set by probe path setting means, measuring said shape description data and thereby acquiring a characteristic value specific to the position in said virtual space of said virtual probe for each of said probe paths; and
   a process by the probe path setting means of generating a new probe path using said characteristic value obtained for said probe paths and thereby sequentially setting said plurality of probe paths,
   wherein when a shape model of a pipeline having a pipeline component is generated, said virtual probe measuring means acquires the position of a cross section center point in said pipeline component as said characteristic value from said shape description data and generates said new probe path using the acquired center point.

7. The shape model generation method for generating a shape model of an object from data acquired for the object to describe the shape of the object, comprising:

a process by virtual probe measuring means of causing a virtual probe defined as an area having a finite expansion in a virtual space in said shape description data to sequentially scan a plurality of probe paths sequentially set by probe path setting means, measuring said shape description data and thereby acquiring a characteristic value specific to the position in said virtual space of said virtual probe for each of said probe paths; and a process by the probe path setting means of generating a new probe path using said characteristic value obtained for said probe paths and thereby sequentially setting said plurality of probe paths, wherein when a shape model of a hybrid material made up of a plurality of different materials is generated, said virtual probe measuring means acquires the surface position for each of said different materials as said characteristic value from said shape description data and generates said new probe path using the acquired surface position.

8. A shape model generation method for generating a shape model of an object from data acquired for the object to describe the shape of said object, comprising:

a process by virtual probe measuring means of causing a virtual probe defined as an area having a finite expansion in a virtual space in said shape description data to sequentially scan a plurality of probe paths, measuring said shape description data and thereby acquiring a characteristic value specific to the position in said virtual space of said virtual probe for each of said probe paths;

a process by temporary internal point cloud generation means of generating temporary internal point cloud data about inner points such as a temporary medial point positioned inside said object from said shape description data;

a process by temporary probe path setting means of temporarily setting a probe path for the respective inner points of said temporary internal point cloud using the respective inner points as passing points;

a process by temporary internal point cloud/temporary probe path updating means of updating said temporary internal point cloud based on said characteristic value acquired by said virtual probe measuring means through measurement of said temporary probe path and updating/setting said probe path for each point of the new temporary internal point cloud obtained by the update; and a process by convergence detection means of carrying out convergence detection on the temporary probe path updated/set by said temporary internal point cloud/temporary probe path updating means and regarding, when it is detected that a predetermined convergence condition is satisfied, said temporary internal point cloud as a true inner point cloud.

9. A shape model generation system for generating a shape model of an object from data acquired for the object to describe the shape of said object, comprising:

virtual probe measuring means for causing a virtual probe defined as an area having a finite expansion in a virtual space of said shape description data to sequentially scan a plurality of probe paths, measuring said shape description data and thereby acquiring a characteristic value specific to the position in said virtual space of said virtual probe for each of said probe paths;

temporary medial point cloud generation means for generating temporary medial point cloud data about a temporary medial point positioned inside said object from said shape description data;

temporary probe path setting means for temporarily setting probe paths for each medial point of said temporary medial point cloud using the medial points as passing points;

temporary medial point cloud/temporary probe path updating means for updating said temporary medial point cloud based on said characteristic value acquired by said virtual probe measuring means through measurement of said temporary probe path and updating said probe paths for the respective medial points of a new temporary medial point cloud acquired by the update; and convergence detection means of carrying out convergence detection on the temporary probe path updated/set by said temporary medial point cloud/temporary probe path updating means under a predetermined convergence condition.

* * * * *